United States Patent [19]

Nonomura et al.

[11] Patent Number: 5,734,788
[45] Date of Patent: Mar. 31, 1998

[54] MULTIMEDIA OPTICAL DISC WHICH CAN PRESERVE THE FRESHNESS OF STORED DATA, A REPRODUCTION APPARATUS FOR REPRODUCING SUCH OPTICAL DISC AND A REPRODUCTION METHOD

[75] Inventors: Tomoyuki Nonomura, Osaka; Masayuki Kozuka, Neyagawa; Yoshihisa Fukushima, Osaka; Kazuhiko Yamauchi, Neyagawa; Kaoru Murase, Ikoma-gun; Katsuhiko Miwa, Osaka, all of Japan

[73] Assignee: Matsushita Electric Industrial Co., Ltd., Osaka-fu, Japan

[21] Appl. No.: 700,084

[22] Filed: Aug. 20, 1996

[30] Foreign Application Priority Data

Aug. 21, 1995 [JP] Japan ................... 7-211946
Mar. 25, 1996 [JP] Japan ................... 8-067721

[51] Int. Cl.$^6$ ............................... H04N 5/781; H04N 5/85
[52] U.S. Cl. ............................................. 386/126; 386/125
[58] Field of Search ................................ 386/126, 125, 386/124, 95, 96, 105, 46, 52, 55, 15, 35; 369/275.3; H04N 5/781, 5/85

[56] References Cited

U.S. PATENT DOCUMENTS

| | | |
|---|---|---|
| 4,953,035 | 8/1990 | Yoshio . |
| 5,043,826 | 8/1991 | Yoshio et al. . |
| 5,065,252 | 11/1991 | Yoshio et al. . |
| 5,097,349 | 3/1992 | Nomura et al. . |
| 5,477,084 | 12/1995 | Takezawa .................. 369/48 |

FOREIGN PATENT DOCUMENTS

| | | |
|---|---|---|
| 4219627 | 8/1992 | Japan . |
| 689547 | 3/1994 | Japan . |
| 6309841 | 11/1994 | Japan . |

*Primary Examiner*—Robert Chevalier
*Attorney, Agent, or Firm*—Price, Gess & Ubell

[57] ABSTRACT

A multimedia optical disc including data area and index area is provided. The data area includes objects each of which includes video data. The index area includes sub-areas. Each sub-area includes addresses of objects selected from the objects in the data area, a flag indicating a random reproduction of the objects selected, and a number of repeats of the random reproduction.

18 Claims, 21 Drawing Sheets

| TITLE | ENTRY PROGRAM CHAIN NUMBER | VOB ADDRESS INFORMATION TABLE | PG REPRODUCTION PATTERN |
|---|---|---|---|
| MAKE YOUR ARMS SLIM | PGC#1 | VOB#3 ADDRESS INFORMATION<br>VOB#5 ADDRESS INFORMATION<br>VOB#8 ADDRESS INFORMATION<br>⋮<br>+TOTAL 15 | SHUFFLE<br>NO. OF CYCLES=10 |
| MAKE YOUR WAIST SLIM | PGC#2 | VOB#6 ADDRESS INFORMATION<br>VOB#7 ADDRESS INFORMATION<br>VOB#9 ADDRESS INFORMATION<br>⋮<br>+TOTAL 12 | SHUFFLE<br>NO. OF CYCLES=10 |
| TOTAL FITNESS COURSE | PGC#3 | VOB#1 ADDRESS INFORMATION<br>VOB#4 ADDRESS INFORMATION<br>VOB#6 ADDRESS INFORMATION<br>⋮<br>+TOTAL 5 | RANDOM<br>NO. OF CYCLES=3 |
| DIGEST VERSION | PGC#4 | VOB#1 ADDRESS INFORMATION<br>VOB#2 ADDRESS INFORMATION<br>VOB#3 ADDRESS INFORMATION<br>⋮<br>+TOTAL 15 | NO INDICATION<br>NO. OF CYCLES=0 |

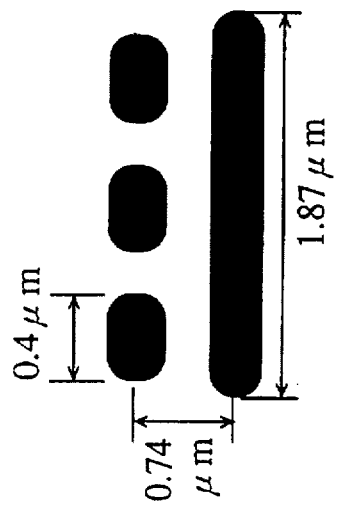
Fig. 1A
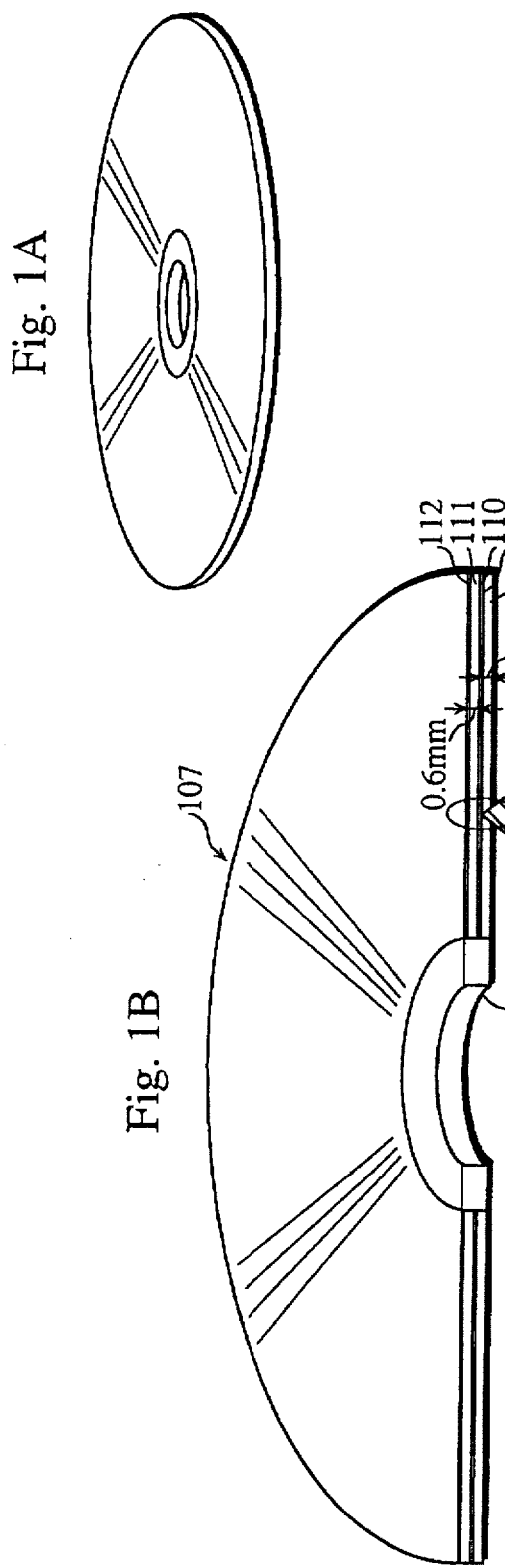
Fig. 1B
Fig. 1D
Fig. 1C

Fig. 8

| VOB #1 | RHYTMICAL STEPS |
|---|---|
| VOB #2 | RAISE RIGHT LEG, LEFT LEG |
| VOB #3 | TWIST WAIST WITH ARMS OUTSTRETCHED HORIZONTALLY |
| VOB #4 | JUMP |
| VOB #5 | STRETCH OUT ARMS AND SWING IN FRONT OF BODY |
| VOB #6 | TWIST WAIST |
| VOB #7 | BEND FORWARD |
| VOB #8 | STRETCH OUT ARMS AND LET SWING |
| VOB #9 | JUMP WITH RAISED KNEES |
| ⋮ | ⋮ |
| VOB #30 | |

Fig. 9

| TITLE | ENTRY PROGRAM CHAIN NUMBER | VOB ADDRESS INFORMATION TABLE | PG REPRODUCTION PATTERN |
|---|---|---|---|
| MAKE YOUR ARMS SLIM | PGC#1 | VOB#3 ADDRESS INFORMATION<br>VOB#5 ADDRESS INFORMATION<br>VOB#8 ADDRESS INFORMATION<br>...<br>+TOTAL 15 | SHUFFLE<br>NO. OF CYCLES=10 |
| MAKE YOUR WAIST SLIM | PGC#2 | VOB#6 ADDRESS INFORMATION<br>VOB#7 ADDRESS INFORMATION<br>VOB#9 ADDRESS INFORMATION<br>...<br>+TOTAL 12 | SHUFFLE<br>NO. OF CYCLES=10 |
| TOTAL FITNESS COURSE | PGC#3 | VOB#1 ADDRESS INFORMATION<br>VOB#4 ADDRESS INFORMATION<br>VOB#6 ADDRESS INFORMATION<br>...<br>+TOTAL 5 | RANDOM<br>NO. OF CYCLES=3 |
| DIGEST VERSION | PGC#4 | VOB#1 ADDRESS INFORMATION<br>VOB#2 ADDRESS INFORMATION<br>VOB#3 ADDRESS INFORMATION<br>...<br>+TOTAL 15 | NO INDICATION<br>NO. OF CYCLES=0 |

Fig. 19
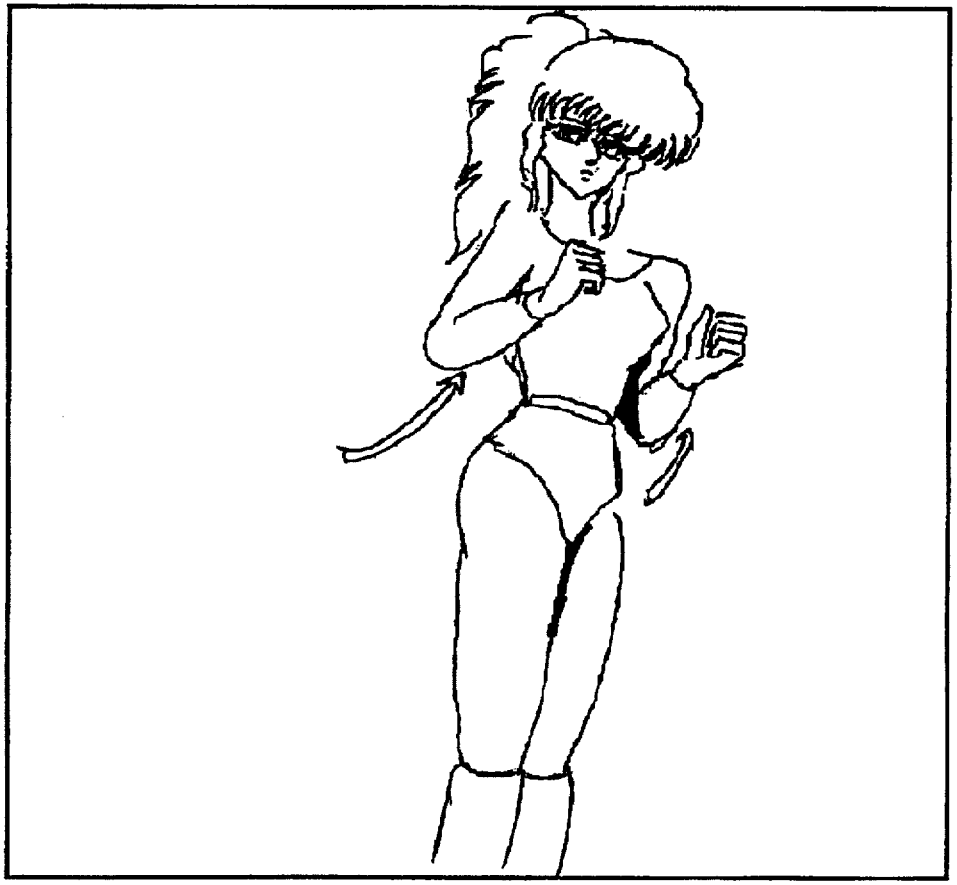

MULTIMEDIA OPTICAL DISC WHICH CAN PRESERVE THE FRESHNESS OF STORED DATA, A REPRODUCTION APPARATUS FOR REPRODUCING SUCH OPTICAL DISC AND A REPRODUCTION METHOD

BACKGROUND OF THE INVENTION

1. Field of the Invention

The present invention relates to an optical disc which stores information signals recorded and to a reproduction apparatus for reproducing such optical discs, more specifically to an optical disc which stores multimedia data including digital moving picture data, audio data, and sub-picture data and to an optical disc reproduction apparatus for reproducing such optical discs.

2. Description of the Prior Art

Interactive software titles of various genres, such as aerobics, education and cooking, have been becoming increasingly noticeable of late in the market of music and movie software titles. Such interactive software titles include a plurality of branches during the reproduction of an optical disc, with the user being able to select the branch-to addresses. Interactive software titles with simple mechanisms have already been achieved for conventional video CD applications.

The first basic technique for the achievement of interactive software is distributed recording. This refers, for example, to the division of a one-hour-long movie into, say, one-minute-long or five-minute-long sections which are recorded in separate areas on a spiral track, but not in a sequential order. The second basic technique is random accessing in which pieces of image information stored in separate areas are read in an arbitrary order using a plurality of sets of control information. Such sets of control information for random accessing each include a reading order of the pieces of image information and address information specifying areas on the spiral track in which the pieces of image information are recorded. Here, there can be as many sets of control information as there are reading orders, with the user being able to select a reading order from a menu displayed on the screen.

In this way, interactive software can provide several courses that can be selected by the user using menus.

The following is a description of an interactive aerobics software title. This aerobics interactive software title has a plurality of shots of an instructor doing different exercises, with several reproduction routes being recorded in the title. These reproduction routes correspond to courses such as "make your waist slim," "make your legs slim," and "Lose five kilos" which can be selected by the user according to his/her purpose. As one example, if the user selects the "make your legs slim" course, a series of shots including leg exercises, such as moving around with rhythmical steps, jumping, raising right leg high, and raising left leg high, are reproduced in succession.

If the user selects the "make your waist slim" course, a series of shots concerning waist exercises, such as twisting the waist to the right and left or bending over, are reproduced in succession.

A menu which is displayed using image data and which includes these course titles is displayed on the screen when the user loads the optical disc into the disc reproduction apparatus. Then, after the user has selected a desired course from the menu in accordance with his/her purpose, physical condition and quickness, the disc reproduction apparatus sequentially reads a plurality of shots in a reproduction route which corresponds to the selected course. The read shots are converted into image signals to be displayed on the screen. Here, by following the instructor's movements which are displayed on the screen, the user can enjoy a desired exercise program in the comfort of their own home. Should the user get bored with the selected program or wish to try something new, he/she can select another course and adjust its level to suit him/her.

This kind of interactive software title recorded on an optical disc is ideal for a housewife who is on a diet since she can select an exercise program according to her physical condition and purpose and can exercise in between her chores. Such interactive software titles are also beneficial for company employees since they can complete a short exercise program, such as before going to work, in order to compensate for their lack of exercise.

Here, although conventional interactive software titles include a plurality of courses, these courses use a same reproduction order every time. For this reason, users tend to get bored with the exercise programs provided by such titles. For the example of an aerobics software title, the user can soon master the movements repeated in the lesson, so that such software titles quickly become routine to users. Here, there have been suggestions to provide a random reproduction function to the disc reproduction apparatus so as to avoid this tendency for the reproduced content to become routine. Such a random reproduction function, which is a function for reproducing pieces of data recorded on a storage medium in a random order, is widely used in the reproduction of music software. However, it is not desirable to use this function for interactive software titles since the function regards every piece of data recorded on the optical disc as a potential reproduction object. This is to say, for the example of an interactive aerobics title, conventional random reproduction could have a menu, a shot of the instructor raising his/her leg, and a shot of the instructor shaking his/her arms displayed in that order, which would clearly make no sense to the user and would be of little value as exercise.

As can be clearly seen from the above example, for certain kinds of interactive title, the reproduction of pieces of data recorded on the optical disc at complete random destroys the logical structure of reproduction routes for each course. To avoid such disordered reproduction, a user programming function may be used. Here, a user programming function is a function which invites the user to set the reproduction order of the course by himself/herself. Here, the manual or jacket of the software title can assist the user in setting such a reproduction order, with most modern disc reproduction apparatuses being equipped with this function. However, the setting of such functions tend to be rather complicated, so that users, such as housewives or office workers, may not have enough time for setting reproduction orders by themselves. Such time-consuming procedures may end up only discouraging users from using such aerobics software titles.

SUMMARY OF THE INVENTION

It is therefore the first object of the present invention to provide a multimedia optical disc and a reproduction apparatus which achieve an interactive software title in which a plurality of pieces of moving picture data in a course selected by the user can be reproduced in a random order without making the user feel confused.

It is the second object of the present invention to provide a multimedia optical disc and a reproduction apparatus which achieve an interactive software title in which a plurality pieces of moving picture data in a course selected by the user can be reproduced in a random order without requiring prior programming by the user.

The above objects are achieved by a multimedia optical disc comprising a data area and an index area, the data area comprising a plurality of objects each of which includes video data, and the index area comprising a plurality of sub-areas each of which includes addresses of objects selected from the plurality of objects stored in the data area, a flag indicating a random reproduction of the objects selected, and a number of repeats of the random reproduction.

With such a construction, the disc reproduction apparatus generates random numbers and selects the addresses in the same sub-area at random after reading data recorded as above. As understood from the above description, since each of the sub-areas includes a random reproduction instruction and selected addresses, the objects to be selected at random are limited to the addresses in each of the sub-areas. Here, if each course such as "make your legs slim" and "make your waist slim" corresponds to a sub-area, the objects in each course are read and reproduced at random. As a result, the objects of each course are reproduced in arbitrary order, with the regularity of the course, which is constructed under the logical structure of the interactive software title, being maintained. Accordingly, the reproduction of the optical disc does not make the user feel confused and provides the user freshness for a long time by reproducing objects in a course in a random order, without requiring prior programming by the user.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 1A shows an appearance of an optical disc used in the present embodiment;

FIG. 1B is a cross section of the optical disc.

FIG. 1C is an enlarged detail of a part of the optical disc where the optical spot is shone;

FIG. 1D shows pit sequences on information layer 109.

FIG. 8 shows contents of moving picture data in VOBs;

FIG. 9 shows contents of descriptions in PGC information of Video Title Set V2;

FIG. 19 shows images displayed on the screen when VOB#8 is read;

DESCRIPTION OF THE PREFERRED EMBODIMENT

Figure 2A:
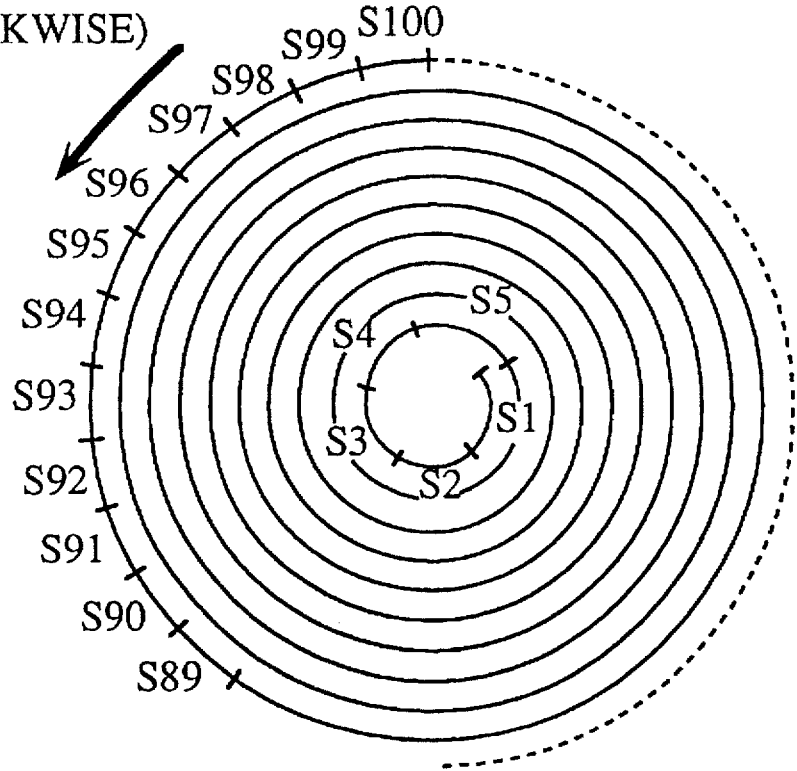
FIG. 2A shows a track arranged on the information layer of the optical disc.

An optical disc storing multimedia data suitable for the present embodiment is a digital video disc (DVD) with a diameter of 120 mm which can store about 4.7 GB of information on one side.

The following description is divided into a plurality of sections with the section number written on the left-hand side and the title as shown below. (1) and (2) are the highest levels of sections. These sections branch to sub-sections as indicated by the section numbers. The (1) family sections describe optical disc; the (2) family reproduction apparatus (disc reproduction apparatus).

(1.) Physical Construction of the Optical Disc (1.1) Logical Construction of the Optical Disc (1.1.1) Logical Construction . . . Video Title Set (1.1.1.1) Video Title Set . . . Video Title Set Management Information (1.1.1.2) Video Title Set . . . Video Object (VOB)

(1.1.2) Logical Construction . . . Video Manager (2.1) Outline of the Disc Reproduction Apparatus (2.2) Construction Element of the Disc Reproduction Apparatus (2.2.1) Construction Element of the Disc Reproduction Apparatus . . . Construction of System Controlling Unit 93

(2.3) Operation of System Controlling Unit 93

(1.) Physical Construction of the Optical Disc

FIG. 1A shows an appearance of the DVD; FIG. 1B a cross-section of the DVD. FIG. 1C shows an enlarged circled part of FIG. 1B. Starting from the bottom, DVD 107 is formed of a first transparent substrate 108, an information layer 109, a second transparent substrate 111, a bonding layer 110, and a print layer 112 on which a label is printed.

First transparent substrate 108 and second transparent substrate 111 are both about 0.6 mm thick, that is, within a range of about 0.5 mm to 0.7 mm, and are reinforcers which are made of the same material.

Bonding layer 110, formed between information layer 109 and transparent substrate 111, bonds these layers together.

A reflective membrane such a metal foil is attached to a surface of information layer 109 where it is in contact with transparent substrate 108. A high density of indented and protruding pits is formed in this reflective membrane.

FIG. 1D shows pit shapes. The length of a pit ranges from 0.4 μm to 2.13 μm. A whole series of pits form a spiral track with a radial distance of 0.74 μm between the pit lines.

In FIG. 1C, information is retrieved by shining the laser beam 113 on the series of pits and measuring changes in the reflection ratio of the light spot 114.

The light spot 114 on a DVD has a diameter of around 1/1.6 times the diameter of a light spot on a conventional CD due to an increase in the numerical aperture NA of the objective lens and a reduction in the wavelength λ of the laser beam.

DVDs of the physical construction described above can store about 4.7 GB of information on one side, which is almost eight times the storage capacity of a conventional CD. As a result, it is possible to achieve a great improvement in picture quality for moving pictures and to increase the reproduction time from the 74 minutes which was possible with a video CD to over two hours.

The substrate technique which has enabled this improvement in storage capacity is a reduction of the spot diameter D of the laser beam. Here, spot diameter D is given by the equation "D=laser wavelength λ/numerical aperture of objective lens NA," so that the spot diameter D can be reduced by reducing the laser wavelength λ and by increasing the numerical aperture of objective lens NA. It should be noted here that if the numerical aperture of objective lens NA is increased, comatic aberration occurs due to the relative inclination, known as "tilt", between the optical axis of the beam and the disc surface. In order to suppress this phenomenon, DVDs use a transparent substrate of reduced thickness. Such a reduction in the thickness of the transparent substrate creates the problem of reduced physical durability for the disc, although this problem can be overcome by reinforcing DVDs with another substrate.

Data is read from DVDs using an optical system with a short wavelength (650 nm) red semiconductor laser and an objective lens whose NA (numerical aperture) is about 0.6 mm. If the thickness of the transparent substrate is about 0.6 mm, a storage capacity of about 4.7 GB can be achieved for one side of a 120 mm diameter optical disc. With this large storage capacity, there is more than enough capacity for a whole feature film to be recorded on one disc, with it further being possible for the manufacturer to include soundtracks in several different languages. Also, 4.7 GB of storage capacity achieved by this substrate technique is more than enough for a plurality of pieces of moving picture data or audio data.

Figure 2B:
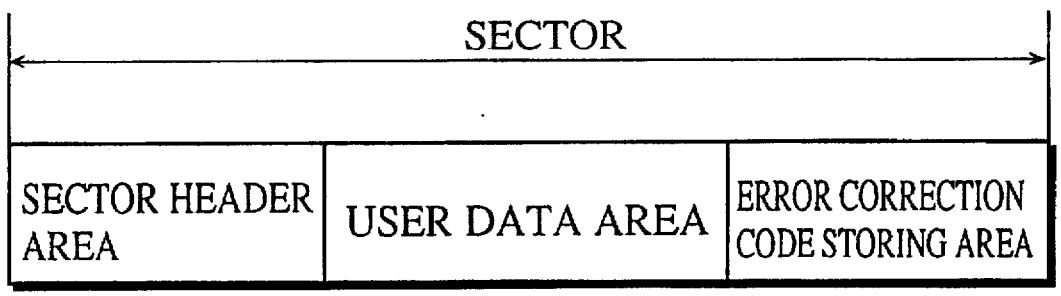
FIG. 2B shows the construction of the physical sector of the information layer of the optical disc.

FIG. 2A shows that a spiral track is formed on the information layer from an inner circle toward the circumference. Data is read from the spiral track in units of sectors. The sector includes, as shown in FIG. 2B, the sector header area, the user data area, and the error correction code storing area.

The sector addresses in the sector header area are used to identify each sector. The disc reproduction apparatus searches sectors to be read by using the sector addresses.

The user data area stores 2 KB of data.

The error correction code storing area stores an error correction code for the user data area in the same sector. The disc reproduction apparatus detects errors using the error correction code when the user data area in the same sector is read, and also corrects the detected errors. This secures the reliability of the data reading.

(1.1) Logical Construction of the Optical Disc

Figure 3A:
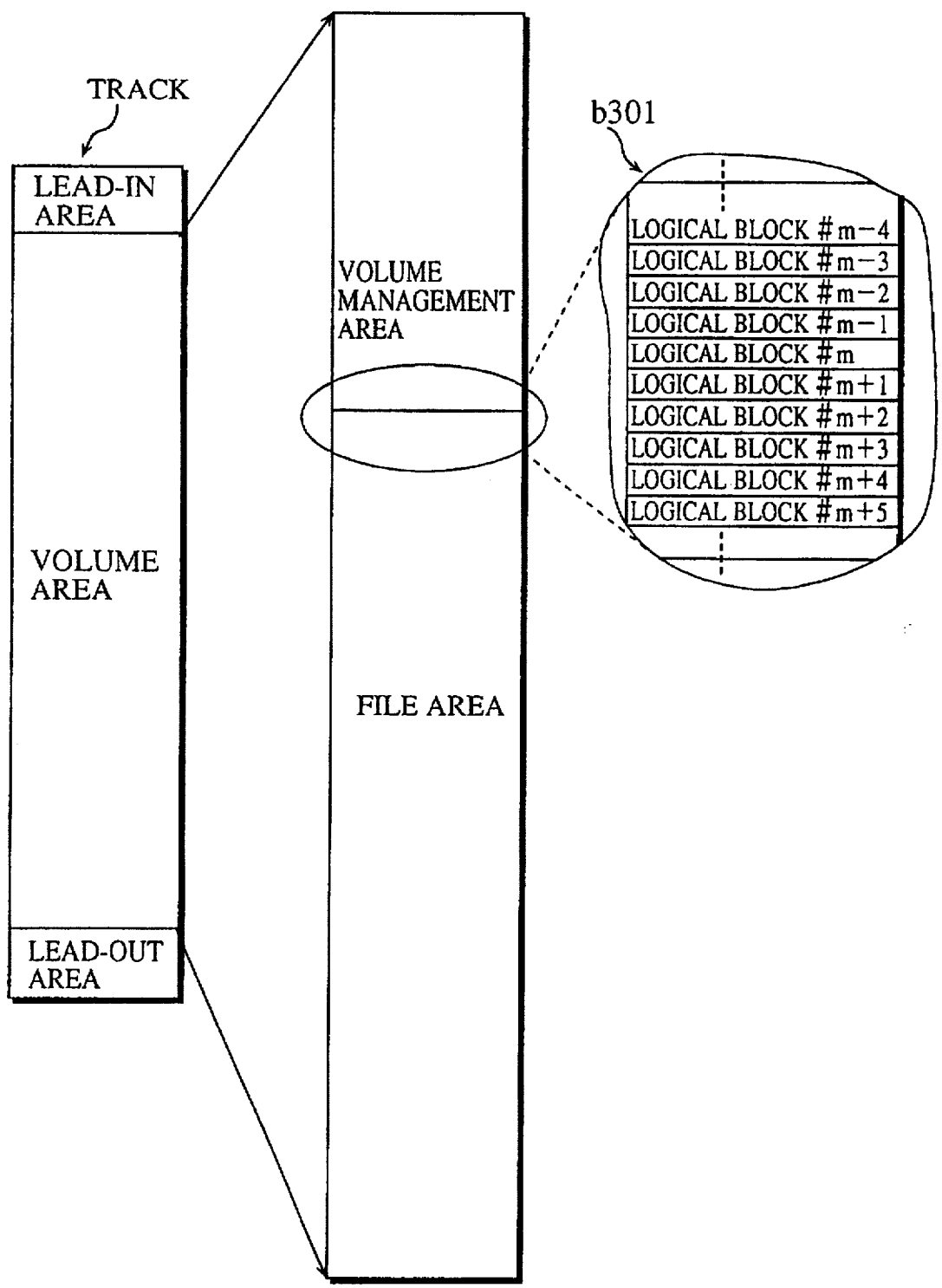
FIG. 3A shows the logical construction of the optical disc.

A spiral track formed with the series of pits includes a lead-in area, a volume area, and a lead-out area. FIG. 3A shows a spiral track re-formed into a rectangle. As shown in this drawing, the lead-in area, volume area, and lead-out area are included in a track in series, and these areas are recognized by identification information included in the sector address. The lead-in area is located at the innermost position of the track; the lead-out area the outermost position. The lead-in area stores operation stabilization data which is used when the DVD player starts reading data from the optical disc. The lead-out area informs the reproduction apparatus of the end of reproduction and does not store meaningful data.

The volume area stores digital data which makes up an application, and manages the physical sector, as a logical block, to which the volume area belongs. The logical blocks are identified by their serial numbers, which are put to consecutive physical sectors with the first physical sector in the data recording area as number 0. "b301" shown in FIG. 3A shows a group of logical blocks in the volume area. The logical blocks have their logical block numbers such as #m, #m+1, #m+2, #m+3, as shown in b301.

As shown in FIG. 3A, the volume area also includes a volume management area and a file area.

The volume management area stores the file system management information conforming to ISO13346, which is used to manage a plurality of logical blocks as files. The file system management information shows the relation between a plurality of file names and addresses of groups of logical blocks. The disc reproduction apparatus achieves the disc access in units of files by using the file system management information. More specifically, if a file name is given, the disc reproduction apparatus refers to all the system management information to calculate all the groups of logical blocks for the file, and accesses the groups of logical blocks to fetch a desired piece of digital data.

Figure 3B:
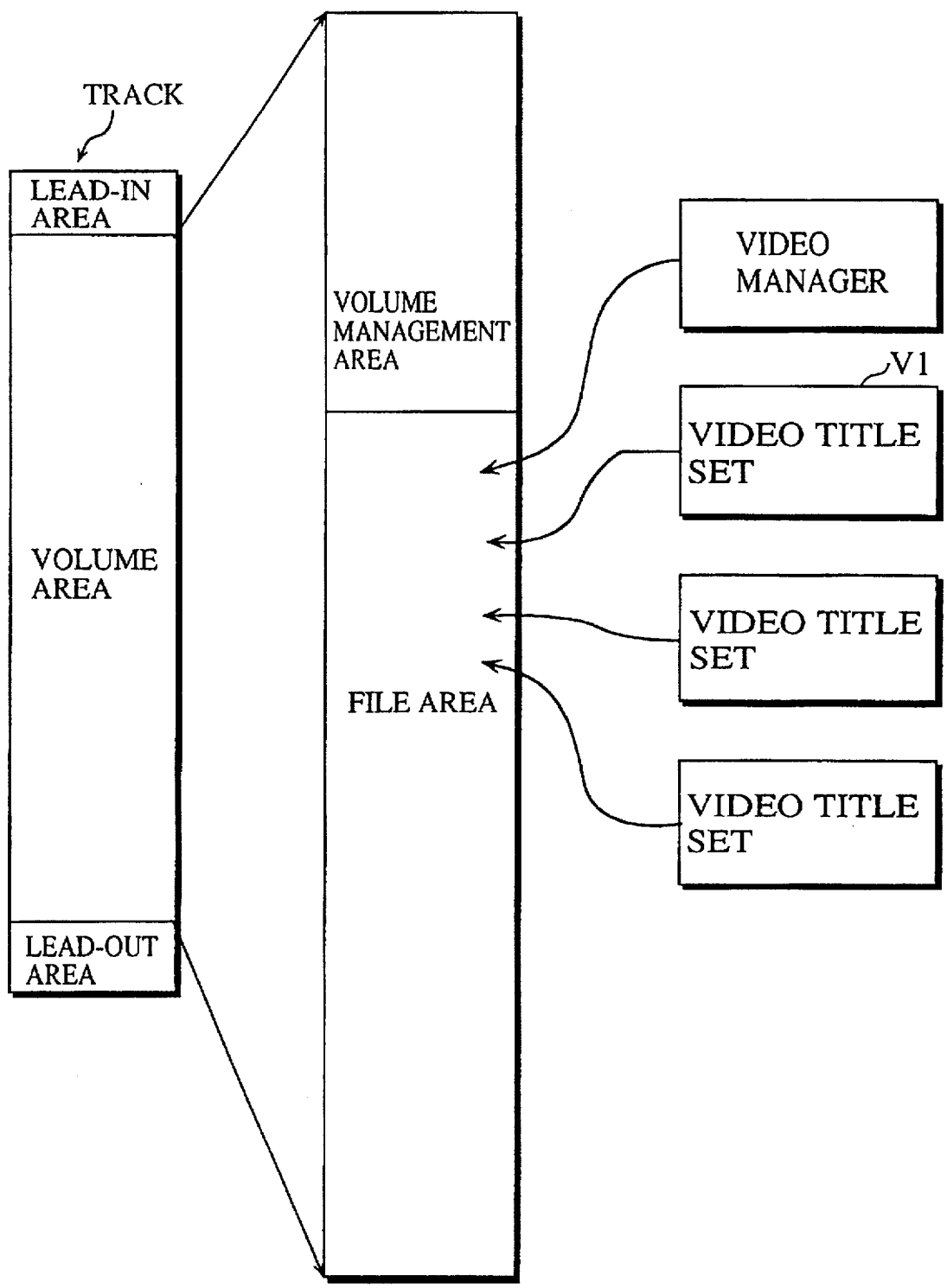
FIG. 3B shows the file area of the optical disc.

FIG. 3B shows the file area. As shown in the drawing, the file area stores a Video Manager and a plurality of Video Title Sets. Each of these elements includes a plurality of consecutive files whose recording positions are calculated from the file system management information. The reason why the files are consecutive is that since the data size of the moving picture data is so large that if the data is included in a file, the file size exceeds 1 GB.

The Video Title Set stores a set of one or more DVD applications called titles. An example of such a set is a movie application in which two versions of the same movie are included, namely, a theater version and an original cutting version. This is because since both versions share many parts of the same movie and can be used in effect when they are managed together as a set.

In FIG. 3B, Video Title Set V1 is an interactive software title called "aerobics." This interactive software title is achieved by the data structure characteristic to the optical disc of the present embodiment.

Interactive software title "aerobics" includes three course titles, namely, "make your waist slim," "make your arms slim," and "total fitness."

The Video Manager stores information on menus. The information is used when the user selects a title among all the titles stored in the plurality of Video Title Sets to reproduce it.

(1.1.1) Logical Construction . . . Video Title Set

Figure 4:
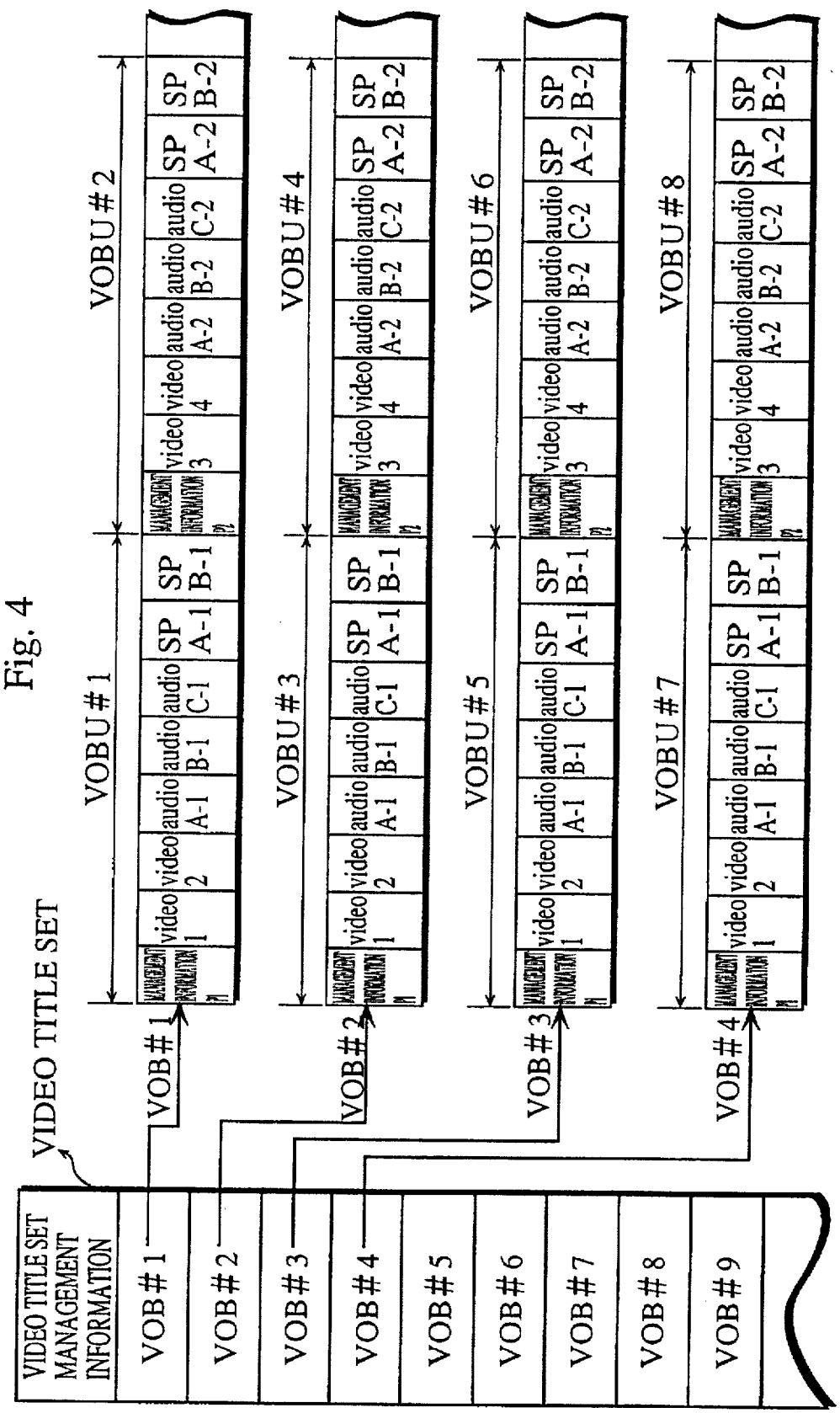
FIG. 4 shows the data construction of the Video Title Set.

FIG. 4 shows the construction of the Video Title Set.

The Video Title Set includes a plurality of video objects (VOBs) and the Video Title Set management information that manages the reproduction order of the video objects (VOBs).

(1.1.1.1) Video Title Set . . . Video Object (VOB)

The video object (VOB) is multimedia data including digital moving pictures, digital sounds, image data, and management data for managing these kinds of data. For example, in interactive software title "aerobics," each of VOB#1, VOB#2, VOB#3, . . . shown in FIG. 4 includes a scene of about 1–2 minutes such as the instructor moving around with rhythmical steps, jumping, raising right leg high, raising left leg high, twisting her waist around right and left, and bending.

A video object (VOB) includes a plurality of VOB units aligned in time series. A VOB unit (VOBU) is a piece of reproduction data with a time period ranging from about 0.5 to 1.0 seconds. A VOB unit includes, as shown in FIG. 4, a management information pack and a plurality of packs, namely, video packs, audio packs, and sub-picture packs. Each data pack has 2 KB of data. By re-constructing these packs, digital data sequences of each video data, audio data, sub-picture data, and control data are generated. These digital data sequences re-constructed in types are called elementary streams. A VOB is also called a program stream or a system stream each of which includes a plurality of elementary streams.

Figure 5:
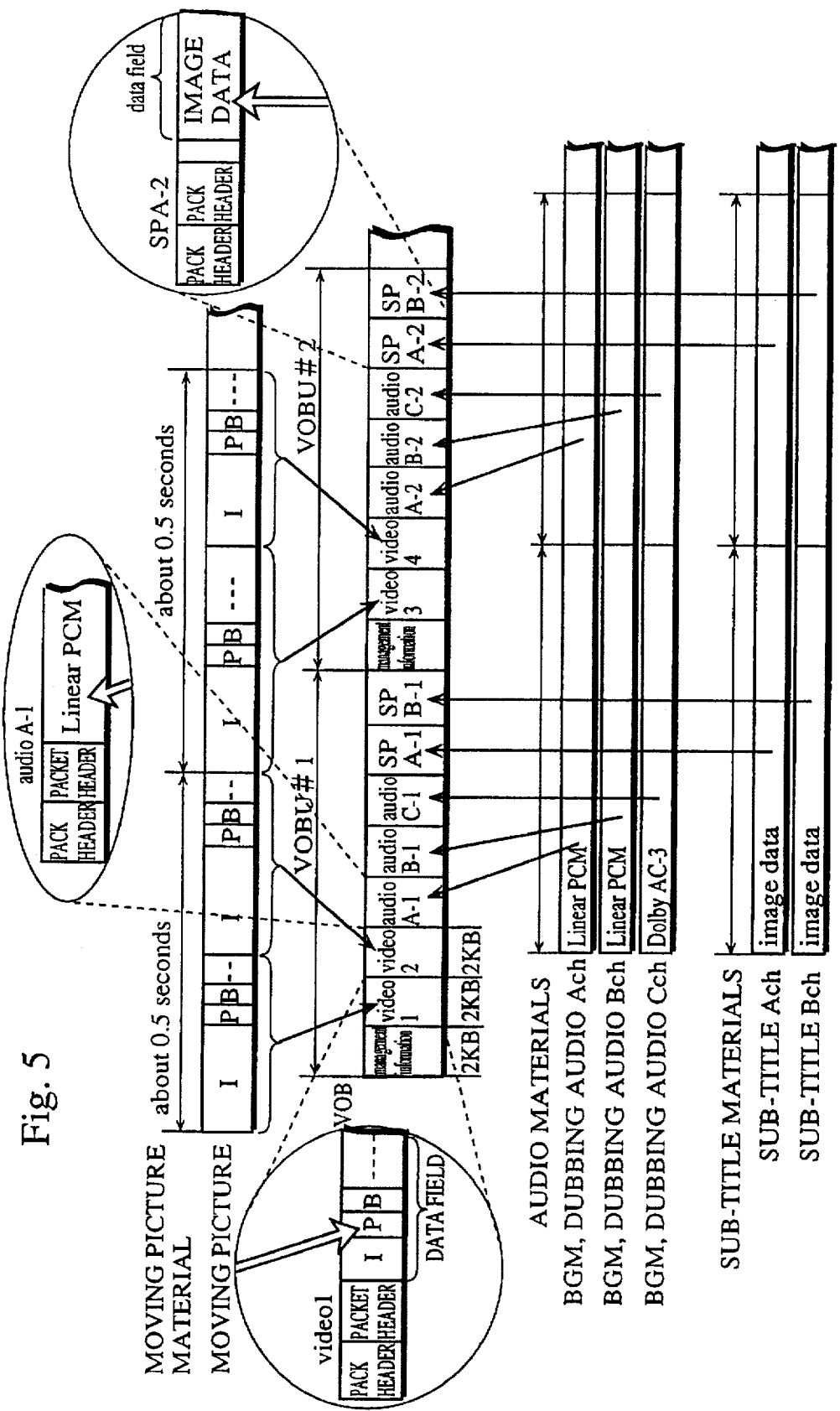
FIG. 5 shows correspondence between moving picture materials, audio materials, and sub-title materials and the packs in video objects (VOBs)

In FIGS. 4 and 5, all data packs are arranged regularly for the sake of explanatory convenience. However, since the reproduction apparatus fetches these packs after storing them in buffers, they can be arranged irregularly, except the management information pack which should be placed at the first position. Also the total number of packs in a VOB unit and the number of packs for each type may not be the same since moving picture data, audio data, and sub-picture data include variable-length compressed data. Actually, each VOB unit has the number of packs different from each other. Also, though the VOB unit of the present embodiment has two video packs, a normal moving picture includes hundreds of video packs since the rate of about 4.5 M bits/s is assigned to the moving picture data for transferring the data to the reproduction apparatus.

The video packs stored in the video object (VOB) form at least one piece of digital video data called GOP (Group of Picture). GOP is a unit of compressed digital moving picture data after decompression, having about 12 to 15 frames of image data. GOP is stipulated under MPEG2 (Moving Pictures Experts Group, ISO11172, ISO13818).

FIG. 5 shows the relation between these packs in VOB and a scene. The drawing shows, from the top, a moving picture material for a scene, a VOB, three channels of audio materials, and two channels of sub-title materials. The downward arrows indicate how moving picture materials are recorded in the data fields of the packs.

As shown in the drawing, a moving picture of about 0.5 seconds from the start is coded into I-pictures (Intra-Pictures), P-pictures (Predictive-Pictures), and B-pictures (Bidirectionally predictive Pictures). Then, the pictures are recorded in the data fields of video packs #1 and #2 in VOBU#1. Note that though there are hundreds of video packs in reality, it is assumed that there are two packs, as described above. Similarly, a moving picture of about 0.5 seconds to 1.0 seconds from the start is coded into I-pictures, P-pictures, and B-pictures. Then, the pictures are recorded in the data fields of video packs #3 and #4 in VOBU#2. Though it is not shown in the drawing, a moving picture of about 1.0 seconds to 1.5 seconds from the start is coded and recorded in the data fields of video packs in the next VOB unit.

The relation between the dubbing in three channels and the data fields of the audio packs are described with reference to FIG. 5. As shown in the drawing, the dubbing in three channels are encoded with the two methods and recorded in the data fields of the audio packs in units of about 0.5 seconds. The dubbing of A channel is recorded in the data fields of audio pack A-1, A-2, A-3, . . . Note that since audio data and moving picture data are synchronized with PTS, audio data and moving picture data in the same VOB unit may not necessarily be used at the same time. Actually, it may happen that the previous VOB unit stores a piece of audio data corresponding to a piece of moving picture data of the current VOB unit.

Similarly, the dubbing of B channel is recorded in the data fields of audio packs B-1, B-2, B-3, . . . in units of about 0.5 seconds; the dubbing of C channel in the data fields of audio packs C-1, C-2, C-3, . . . .

Hereinafter, pieces of data recorded in the data fields of audio packs A–C are respectively called audio data A, audio data B, and audio data C. For example, English dubbing is set as audio data A, French dubbing is set as audio data B, and Japanese dubbing is set as audio data C, allowing the user to select a desired dubbing.

In FIG. 5, a VOB unit includes two sub-picture pack A and B. Therefore, the sub-titles in two channels are recorded in the data fields of these sub-picture packs. For example, English sub-titles are included in sub-picture data A, and French sub-titles are included in sub-picture data B, allowing the user select any of the languages.

The management information pack is included in each VOB unit at its start, and its management information is effective while the VOB unit is reproduced. The management information pack stores a transfer rate which is required during a VOB unit reproduction, a transfer rate required for each of the moving picture stream, audio stream, sub-picture stream, and a buffer size.

The relation between the sub-picture packs and the management information packs play important roles at interactive operations in an interactive software title when the sub-picture packs includes menus each of which includes several items. A management information pack in the same VOB unit as sub-picture packs of a certain menu includes highlight information which is used to perform a reproduction control according to a cursor operation and a determination operation made by the user against the certain menu. A representative "reproduction control according to a determination operation" in the present embodiment is a branch from a current reproduction route to another reproduction route. This "switch of reproduction route" is achieved by setting highlight commands, which respectively correspond to the items of the certain menu, in the highlight information and executing a highlight command when the management information pack is read by the disc reproduction apparatus. With such setting, the reproduction route is switched to another one in units of pieces of PGC information, which is described later.

(1.1.1.2) Video Title Set Management Information

The Video Title Set management information stores information used for managing the plurality of reproduction orders of the above-described video objects (VOBs). In DVD, the information specifying a reproduction order of a group of video objects (VOBs) is called a program chain (PGC). For example, the Video Title Set storing "aerobics" of the present embodiment has the Video Title Set management information which stores a plurality of program chains specifying the scene developments for "make your waist slim," "make your arms slim," and "total fitness."

Figure 6:
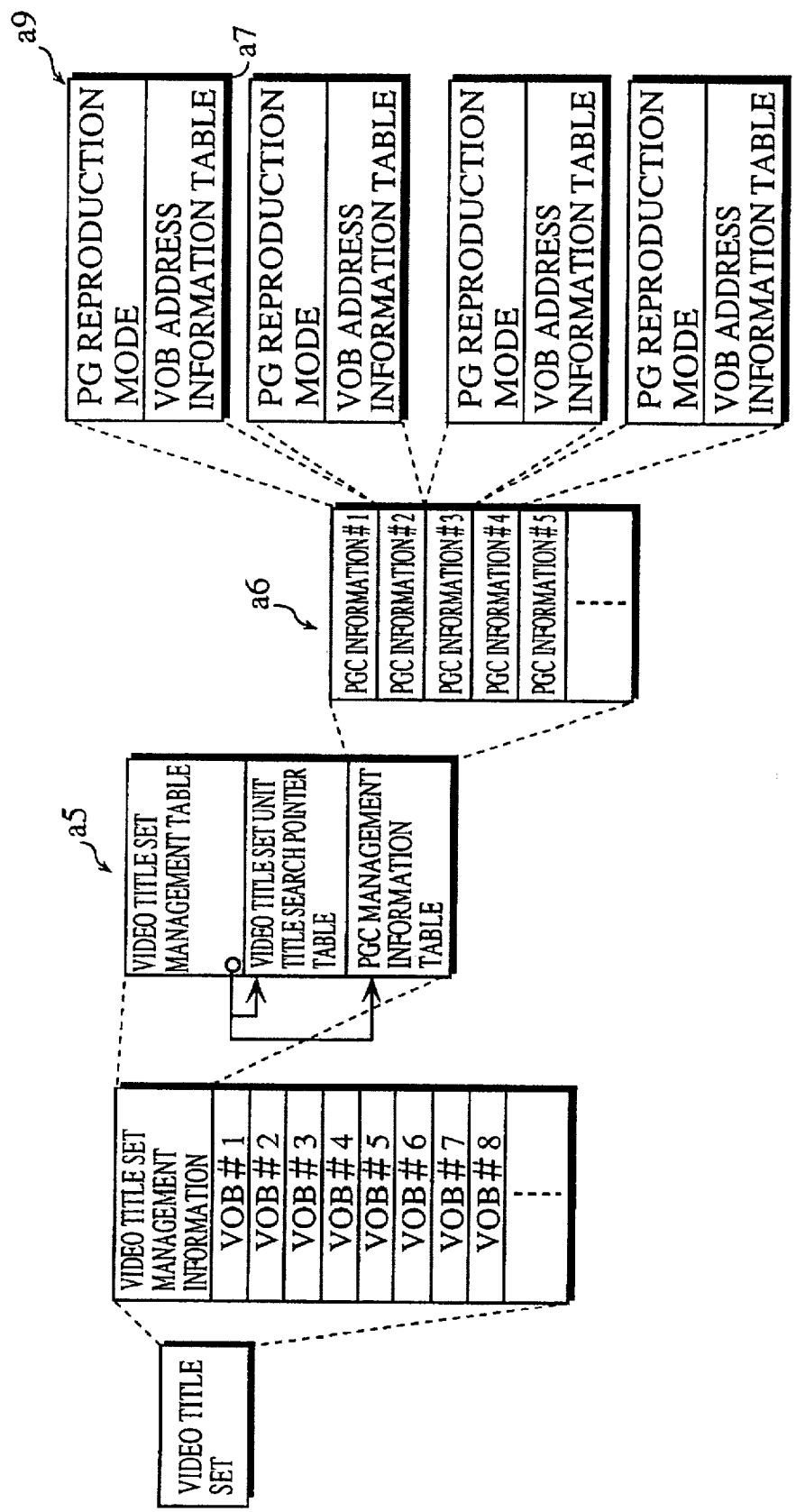
FIG. 6 shows the construction of the Video Title Set management information.

FIG. 6 shows the construction of the Video Title Set management information. As indicated by reference a5 in the drawing, a piece of Video Title Set management information includes a Video Title Set management table, a Video Title Set unit title search pointer table, and PGC management information table.

The Video Title Set management table is the header information of the Video Title Set management information and stores pointers for the storage positions of the Video Title Set unit title search pointer table and the PGC management information table.

The Video Title Set unit title search pointer table is the index of the plurality of program chains stored in the PGC management information table and specifies a pointer for the storage position of a program chain to be executed first in each title. For the present embodiment, the Video Title Set unit title search pointer table relates "make your waist slim," "make your arms slim," and "total fitness" of "aerobics" to corresponding first pieces of PGC information.

The PGC management information table stores, as indicted by reference a6, a plurality of pieces of PGC information #1, #2, #3, #4, . . . #n. Each piece of the PGC information specifies a reproduction order of one or more VOBs.

Which VOB to be read is specified by the VOB address information table indicated by reference a7 in the drawing, and the reproduction order for reading the VOB is specified by the PG reproduction mode indicated by reference a9.

Figure 7A:
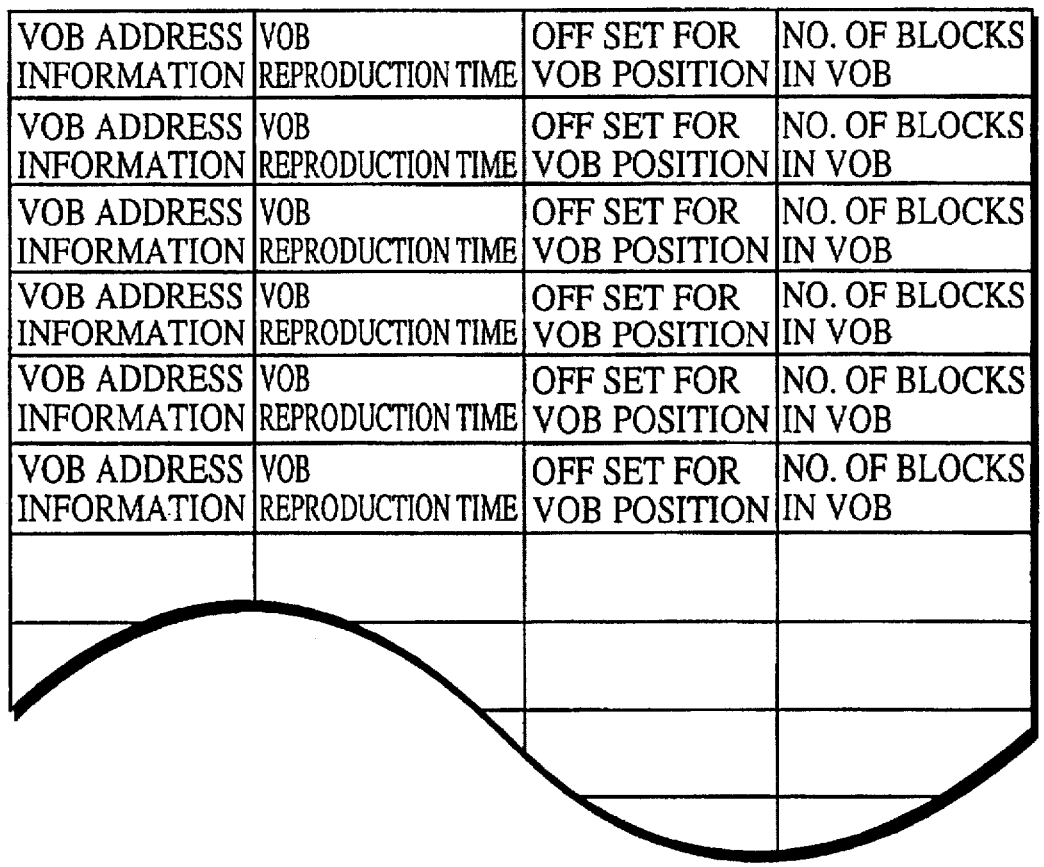
FIG. 7A shows the construction of the VOB address information table.

The VOB address information table stores a plurality of pieces of VOB address information to be reproduced. Each VOB address information, as shown in FIG. 7A, specifies a VOB reproduction time, an offset for a VOB position in the Video Title Set, and the number of logical blocks in the VOB. By using this information, the disc reproduction apparatus calculates the logical block number of all logical blocks which store a VOB when it reads the VOB.

The PG reproduction mode specifies the mode with which the VOBs written in the VOB address information table are reproduced. The VOBs can be reproduced with standard reproduction mode, random reproduction mode, or shuffle reproduction mode. While in standard reproduction mode, the VOBs written in the VOB address information table are reproduced in order of the alignment in the table, in random or shuffle reproduction mode, the VOBs are reproduced at random.

While in random reproduction mode, each VOB may be reproduced twice or more, in shuffle reproduction mode, each VOB is reproduced only once. In other words, the random reproduction mode allows repetitions for the VOBs.

For example, suppose the VOB address information table includes VOB address information of VOB#1, VOB#2, VOB#3, VOB#4, and VOB#5. Also suppose it is specified that these VOBs are reproduced three times with shuffle reproduction mode, with different shuffle reproduction at each reproduction. In this case, the VOBs may be reproduced in the following order:

VOB#5-VOB#1-VOB#3 (at first reproduction),

VOB#2-VOB#3-VOB#5 (at second reproduction), . . .

Now, suppose it is specified that VOBs are reproduced three times with random reproduction mode, with different random reproduction at each reproduction. In this case, the VOBs may be reproduced in the following orders:

VOB#5-VOB#5-VOB#3 (at first reproduction),

VOB#2-VOB#3-VOB#3 (at second reproduction), . . .

Figure 7B:
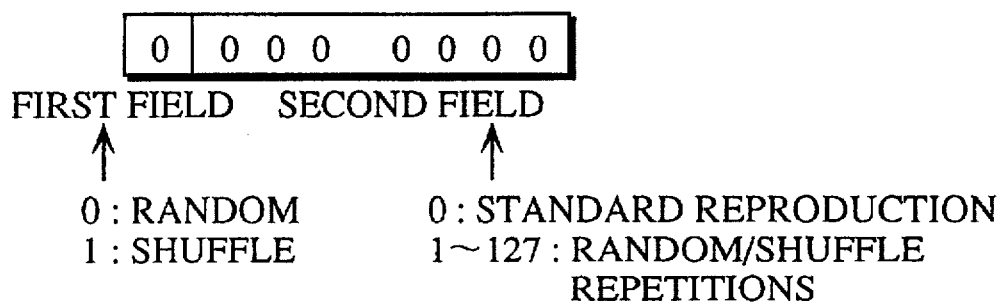
FIG. 7B shows the format of the PG reproduction mode.

FIG. 7B shows the construction of the PG reproduction mode. The PG reproduction has eight bits. The most significant bit is called the first field and the rest of the bits (seven bits) are called the second field. The program chain is reproduced with random reproduction mode if "1" or higher value is specified in the second field and "0" is specified in the first field. Also, the program chain is reproduced with shuffle reproduction mode if "1" or higher value is specified in the second field and "1" is specified in the first field. The second field specifies the number of random or shuffle reproductions. The specified number can be any of 1–127.

If "0" is specified in the second field, the program chain in reproduced with standard reproduction mode.

FIG. 8 is a table showing contents of moving picture date in VOBs. As shown in the drawing, VOB#1 includes a scene of the instructor moving around with rhythmical steps, VOB#2 a scene of raising her right leg and left leg high, VOB#3 twisting her waist with her arms stretched horizontally, VOB#4 jumping, etc. Each VOB includes a scene of about 2–3 minutes.

FIG. 9 shows relation between each course and the contents of the PGC information.

As shown in this drawing, the first program chain of "make your arms slim" is PGC information #1. The VOB address information table of PGC information #1 includes 15 pieces of the VOB address information for 15 VOBs such as VOB#3, VOB#5, and VOB#8 concerning exercises of arms among 30 VOBs in total. Also, the shuffle reproduction mode is specified as the PG reproduction mode, with the number of shuffle reproductions as "10." Generally, the number of combinations of r different objects selected from n objects is denoted by the expression $^nC_r$ which is equal to $n!/r!(n-r)!$. Therefore, the number of ways generated by 10 shuffles with 15 VOBs are obtained from the following equation:

$$^{15}C_{10}=15!/10!*5!=3003.$$

As a result, 3003 different reproduction orders are generated for this reproduction.

Also, the first program chain of "make your waist slim" is PGC information #2. The VOB address information table of PGC information #2 includes 12 pieces of the VOB address information for 12 VOBs such as VOB#6, VOB#7, and VOB#9 concerning exercises of waist among 30 VOBs in total. Also, the shuffle reproduction mode is specified as the PG reproduction mode, with the number of shuffle reproductions as "10." Therefore, the number of ways generated by 10 shuffles with 12 VOBs are obtained from the following equation:

$$^{12}C_{10}=12!/10!*2!=66.$$

As a result, 66 different reproduction orders are generated for this reproduction.

The first program chain of "total fitness" is PGC information #3. The VOB address information table of PGC information #3 includes 5 pieces of the VOB address information for 5 VOBs such as VOB#1, VOB#4, and VOB#6. The random reproduction mode is specified as the PG reproduction mode, with the number of random reproductions as "3." Generally, the number of repeated combinations of r different objects selected from n objects is denoted by the expression $^nH_r$ which is equal to $^{n+r-1}C_r$ equivalent to $(n+r-1)!/r!(n-1)!$. Therefore, the number of ways generated by 3 random reproductions with 5 VOBs are obtained from the following equation:

$$^5H_3=(5+3-1)!/3!*4!=126.$$

As a result, 126 different reproduction orders are generated for this reproduction.

"Total fitness" has less number of VOBs and reproduction cycles. Also, in this course, the same VOBs may be reproduced again and again. Therefore, even a very fat man/woman or a person with less quickness can keep up with the course. On the contrary, "make your arms slim" had a lot of VOBs and reproduction cycles. Also, the reproduction contents change rapidly. Therefore, the course requires more quickness and physical strength. The difference between the beginner course and advanced course is also obvious in the figure. The number of ways for the advanced course ("make your arms slim"), "3003" is about more than 20 times that for the beginner course ("total fitness"), "126." Such a course would satisfy even an "advanced" person in aerobics.

As apparent from the above description, the title creator can provide several courses of aerobics graded such as "beginner," "intermediate," and "advanced" with an optical disc.

The first program chain of "digest" is PGC information #4. The VOB address information table of PGC information #4 includes 15 pieces of the VOB address information for 15 VOBs. The 15 VOBs are from the first VOB to 15th VOB among the total of 30 VOBs of PGC information #4. The number of cycles specifies "0." As a result, in "digest," the 15 VOBs from the first VOB to 15th VOB are reproduced sequentially in the order. This course is good for a person who just wants to look at the screen without doing actual exercises.

(1.1.2) Logical Construction . . . Video Manager

The Video Manager includes video objects (VOBs) and PGC management information table, and the construction is almost the same as that of the Video Title Set. The VOB of the Video Manager differs from that of the Video Title Set in that the Video Manager is specialized in the volume menu. The volume menu provides a list of all the titles included in the optical disc so that the user can select one from the list. The volume menu is displayed on the screen after an optical disc is loaded in the disc reproduction apparatus and the optical pickup moves from the volume management area to the volume area.

There are following differences between the Video Manager and the Video Title Set. First, while the VOB of the Video Title Set includes video packs, audio packs, sub-picture packs, and a management information pack as shown in FIG. 6, the VOB of the Video Manager includes the same kinds of packs for a menu. Secondly, the BRANCH commands of the Video Manager can specify any of a plurality of titles included in a plurality of Video Title Sets as a branch target.

Figure 20:
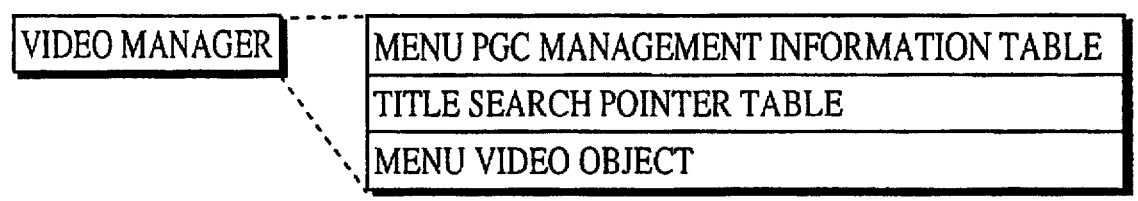
FIG. 20 shows the construction of the Video Manager.

FIG. 20 shows the construction of the Video Manager. As shown in the drawing, the Video Manager includes the menu PGC management information table, the title search pointer table, and the menu video object.

Figure 21:
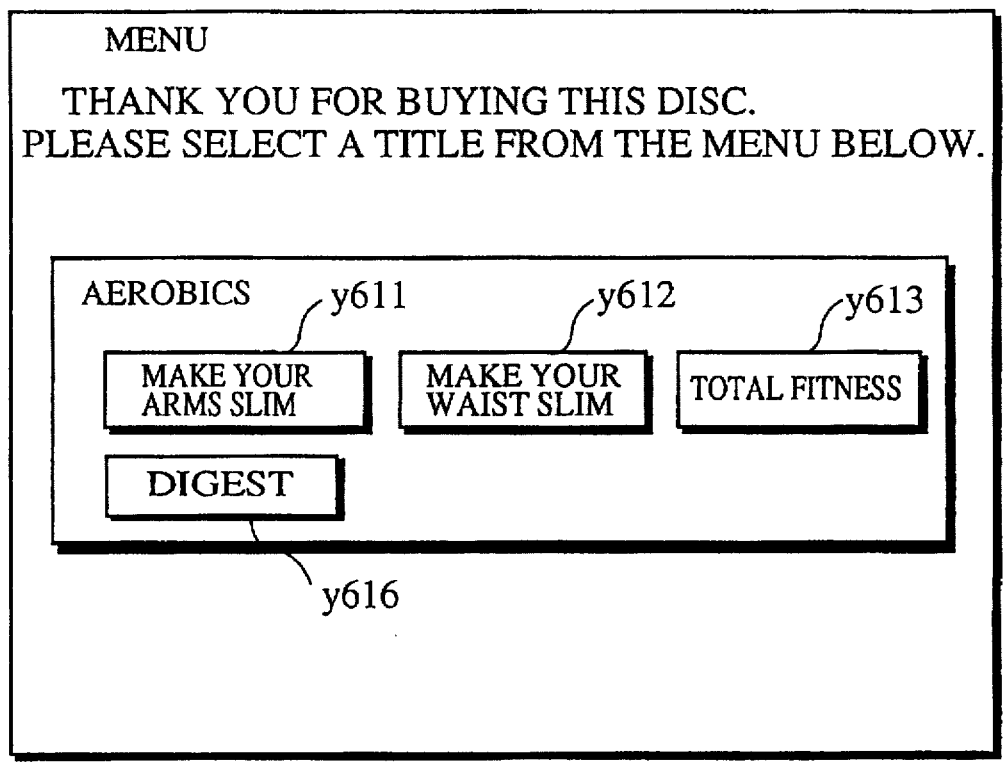
FIG. 21 shows a volume menu.

The menu video object is a VOB specialized in the volume menu. That is, the menu video object includes a sub-picture pack for the volume menu and a management information pack which controls the reproduction according to the selection and determination operations by the user. FIG. 21 is the volume menu displayed on the screen. The menu video object includes a plurality of items, y611, y612, y613, and y616. The items represent titles such as "make your arms slim" and "make your waist slim" of "aerobics." A title is specified when the user selects and determines an item in the menu.

The menu PGC management information table is PGC information specialized in the volume menu. The menu PGC management information table stores a recording section of the menu VOB which is read by the disc reproduction apparatus when the optical disc is inserted. The menu PGC information is read by the disc reproduction apparatus after an optical disc is loaded in the disc reproduction apparatus and the optical pickup moves from the volume management area to the volume area. Then, the volume menu is displayed on the screen.

The title search pointer table is an index used to identify the Video Title Set and the title number of a title.

(2.1) Outline of the Disc Reproduction Apparatus

Figure 10:
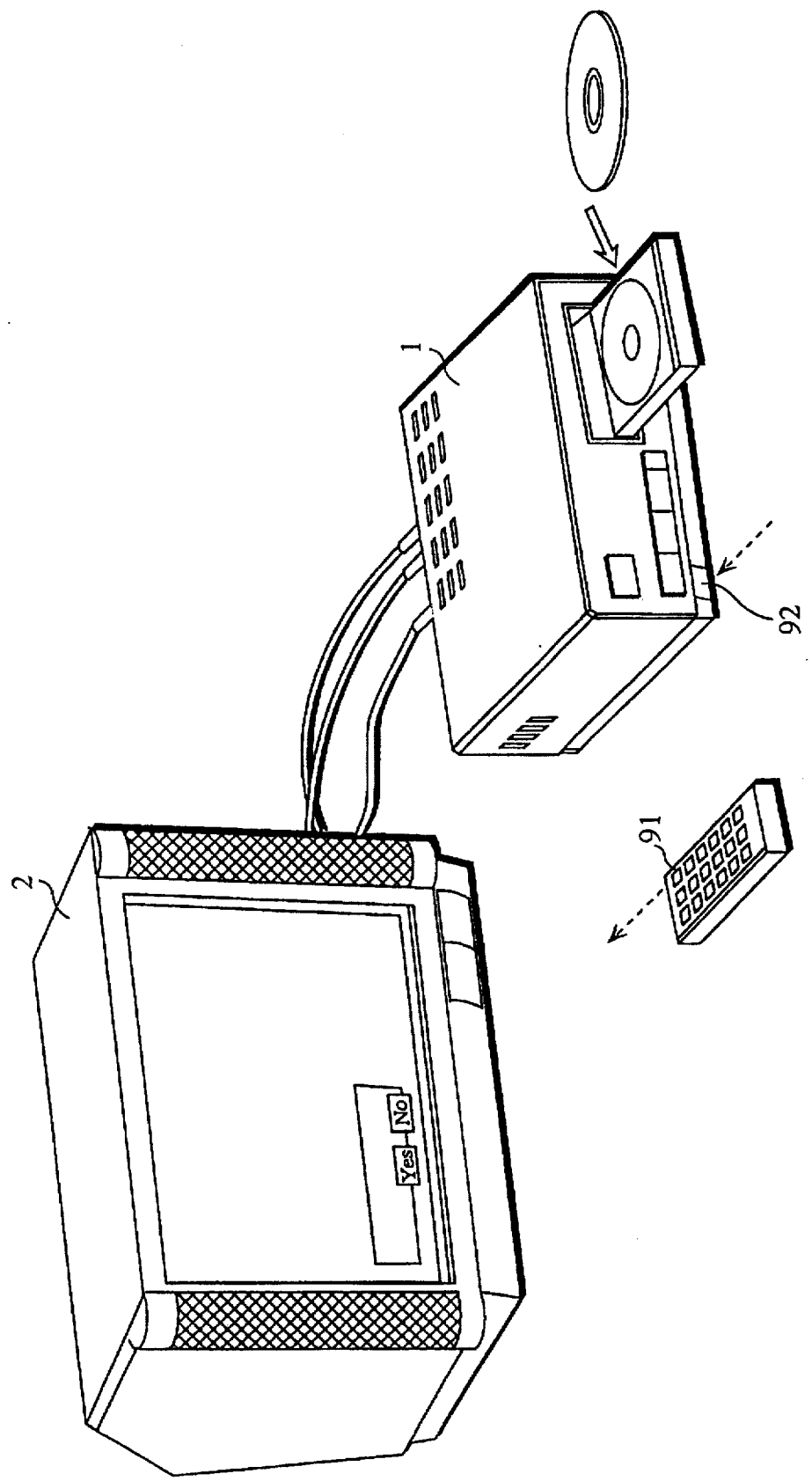
FIG. 10 shows the appearance of the reproduction apparatus used in the present embodiment.

DVD players for reproducing optical discs are described with reference to the drawings. FIG. 10 shows the appearances of DVD player 1, TV monitor 2, and remote controller 91.

DVD player 1 includes an optical disc drive in which an optical disc can be set through the slot on the front side.

Remote control receiving unit 92, also set on the front side of the DVD player, includes a light receiving device which receives infrared rays sent from the remote controller. Responding to an infrared ray from the remote controller by a user operation, remote control receiving unit 92 outputs an interrupt signal indicating that a key signal has been received.

On the rear side of the DVD player, video output terminal and audio output terminal are set. Through AV cords connected to the terminals, image signals reproduced by the DVD player can be output to TV monitor 2. The user can enjoy the images reproduced by the DVD player on a large-size TV such as 33-inch or 35-inch TV. As understood from the above description, DVD player 1 in the present embodiment is intended to be used as a household appliance connected to TV monitor 2, not connected to a personal computer and the like.

Remote controller 91 outputs infrared rays as codes when key pads with springs under them set on the controller are pressed by the user.

(2.2) Construction Element of the Disc Reproduction Apparatus

Figure 11:
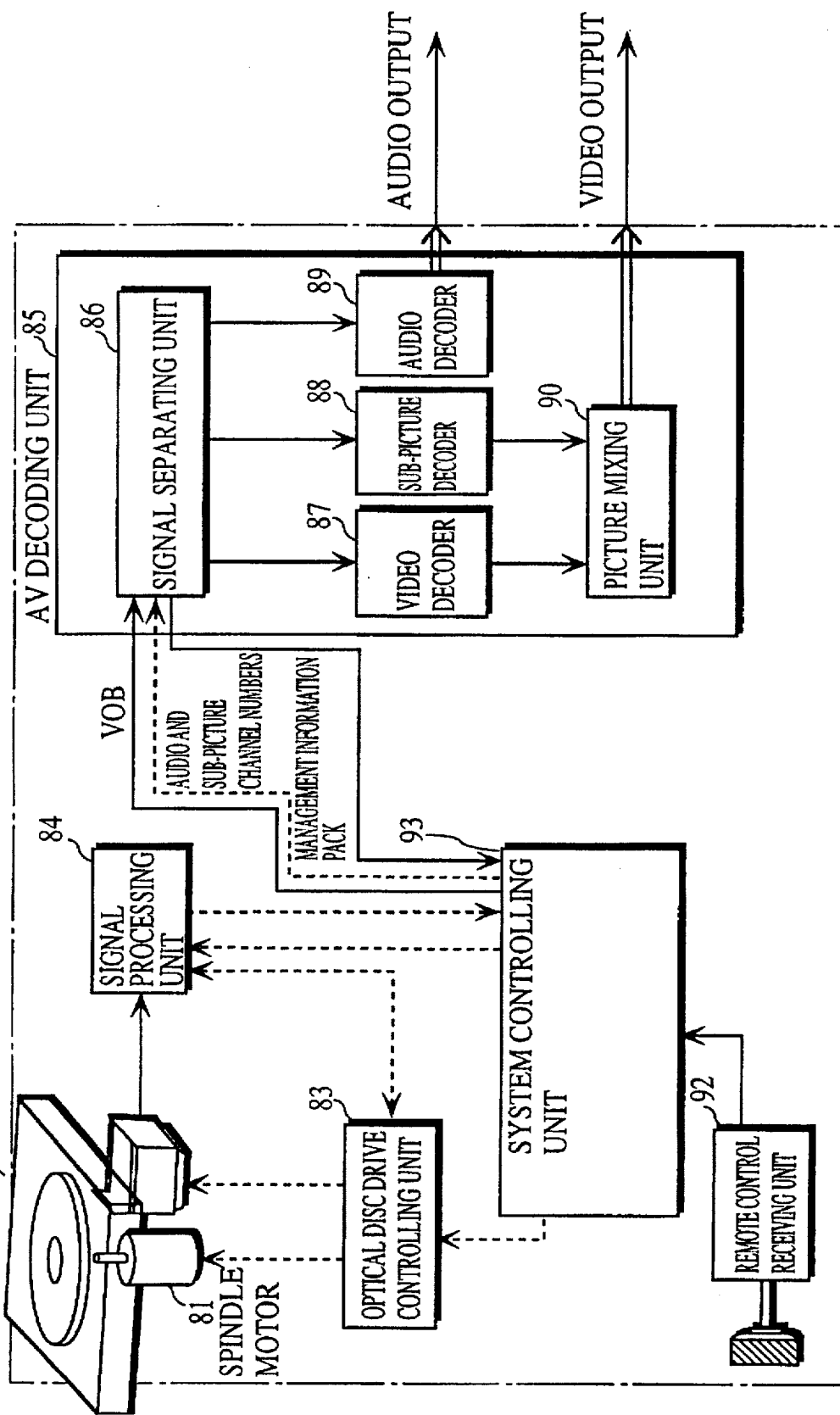
FIG. 11 is a block diagram showing the construction of DVD player 1 used in the present embodiment.

FIG. 11 is a block diagram showing the construction of the DVD player used in the present embodiment. The DVD player includes optical disc drive 16, optical disc drive controlling unit 83, signal processing unit 84, AV decoding unit 85, remote control receiving unit 92, and system controlling unit 93. AV decoding unit 85 comprises signal separating unit 86, video decoder 87, sub-picture decoder 88, audio decoder 89, and picture mixing unit 90.

Optical disc drive 16 comprises a board on which an optical disc is placed and spindle motor 81 for rotating the set optical disc. The board moves in and out of the cubic space by means of an eject mechanism which is not shown in the drawing. The user places an optical disc on the board ejected outside the DVD player. Then, the board moves into the DVD player, loading the optical disc.

Optical disc drive controlling unit 83 controls optical pickup and optical disc drive 16 including spindle motor 81. Specifically, optical disc drive controlling unit 83 adjusts the motor speed according to a track position specified by system controlling unit 93, moves optical pickup by controlling the actuator of the pickup, then after a correct track is detected by servo control, waits for a desired physical sector and reads signals continuously starting from desired position.

Signal processing unit 84 converts the signals read through optical pickup into digital data by processing the signals with amplification, waveform shaping, conversion to binary, demodulation, error correction, etc., then stores the processed data in buffer memory 94 (described later) in system controlling unit 93 in units of logical blocks.

AV decoding unit 85 converts VOBs of digital data into the video signals and audio signals.

Signal separating unit 86 receives the digital data transferred from the buffer memory in units of logical blocks (packets), and classifies the data into the management information data, moving picture data, sub-picture data, and audio data by identifying the stream ID and sub-stream ID of each packet. Signal separating unit 86 outputs the moving picture data to video decoder 87. Signal separating unit 86 outputs the management information pack to system controlling unit 93. System controlling unit 93 sends a channel number for each of the audio material and the sub-title material to signal separating unit 86. Signal separating unit 86 outputs the audio data of the specified channel to audio decoder 89; sub-picture data of the specified channel to sub-picture decoder 88. The audio and sub-picture materials of other channels are discarded.

Video decoder 87 decodes and extends the moving picture data sent from signal separating unit 86 and outputs the data to picture mixing unit 90 as digital video signals.

Sub-picture decoder 88 decodes and extends the sub-picture data sent from signal separating unit 86 if the sub-picture data is image data compressed with run length compression, and outputs the sub-picture data to picture mixing unit 90 in the same format as video signals.

Audio decoder 89 decodes and extends the audio data sent from signal separating unit 86, and outputs digital audio signals.

Picture mixing unit 90 outputs NTSC (National Television System Committee) Video Signals after mixing the outputs from video decoder 87 and sub-picture decoder 88 according to the ratio specified by system controlling unit 93.

(2.2.1) Construction Element of the Disc Reproduction Apparatus . . . Construction of System Controlling Unit 93

Figure 12:
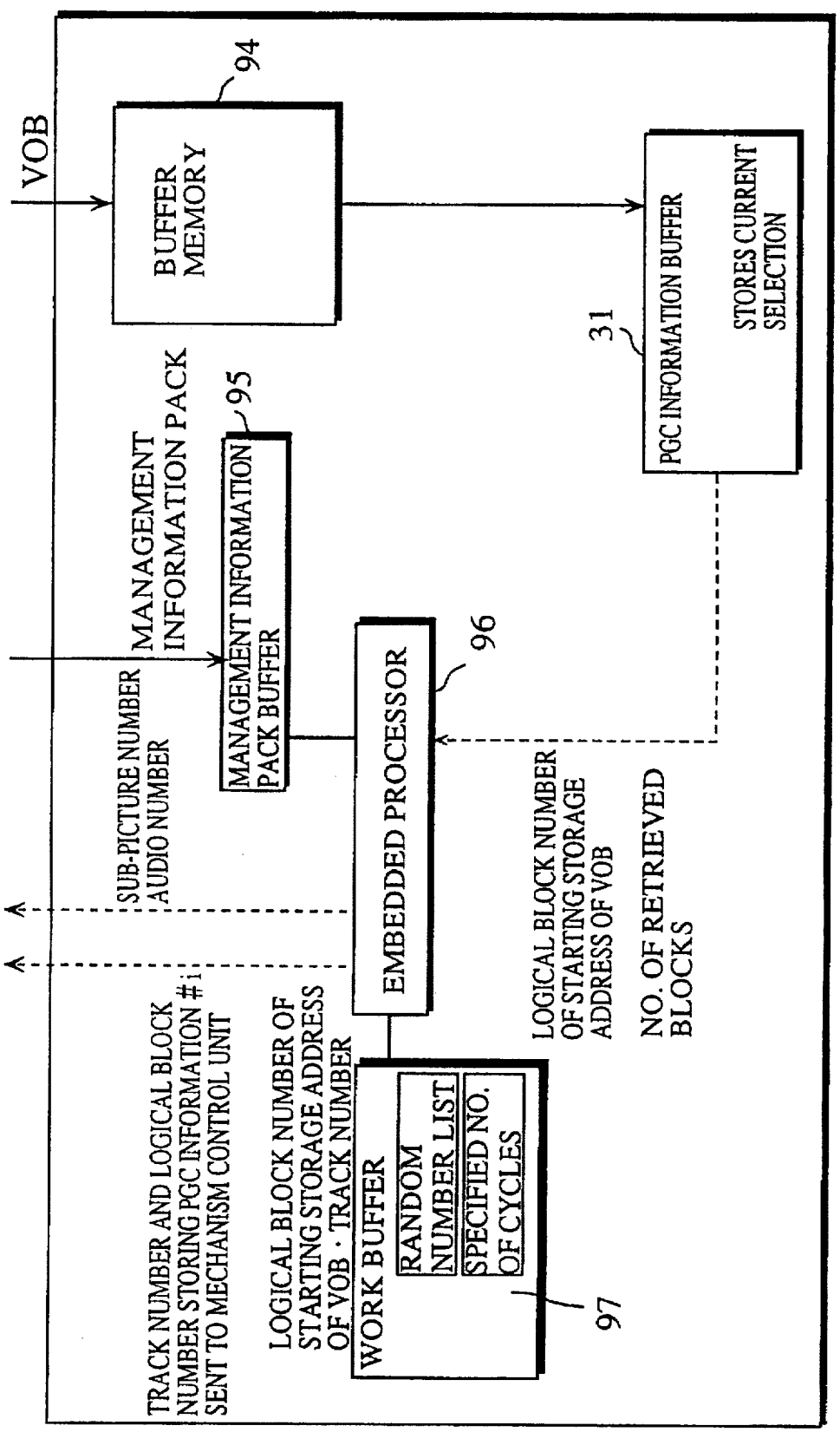
FIG. 12 is a block diagram showing the construction of system controlling unit 93.

System controlling unit 93 controls entire DVD player 1, and is constructed as shown in FIG. 12. System controlling unit 93 includes buffer memory 94, management information pack buffer 95, embedded processor 96, work buffer 97, and PGC information buffer 31.

Buffer memory 94 stores data which has been processed with amplification, waveform shaping, conversion to binary, demodulation, error correction, etc. From buffer memory 94, system controlling unit 93 transfers the Video Title Set management information to another buffer which is not shown in the drawing; VOBs to signal separating unit 86 in units of packs. Signal separating unit 86 sends back the management information pack to system controlling unit 93.

Management information pack buffer 95 stores the management information pack sent back from signal separating unit 86.

Embedded processor 96 includes a ROM which stores a control program of DVD player 1, a work memory, and a CPU.

PGC information buffer 31 stores the PGC information currently selected.

Work buffer 97 stores "random number table" and "specified no. of cycles" which are used in executions of the processes shown in the flowchart of FIG. 12 by system controlling unit 96.

(2.3) Operation of System Controlling Unit 93

Figure 13:
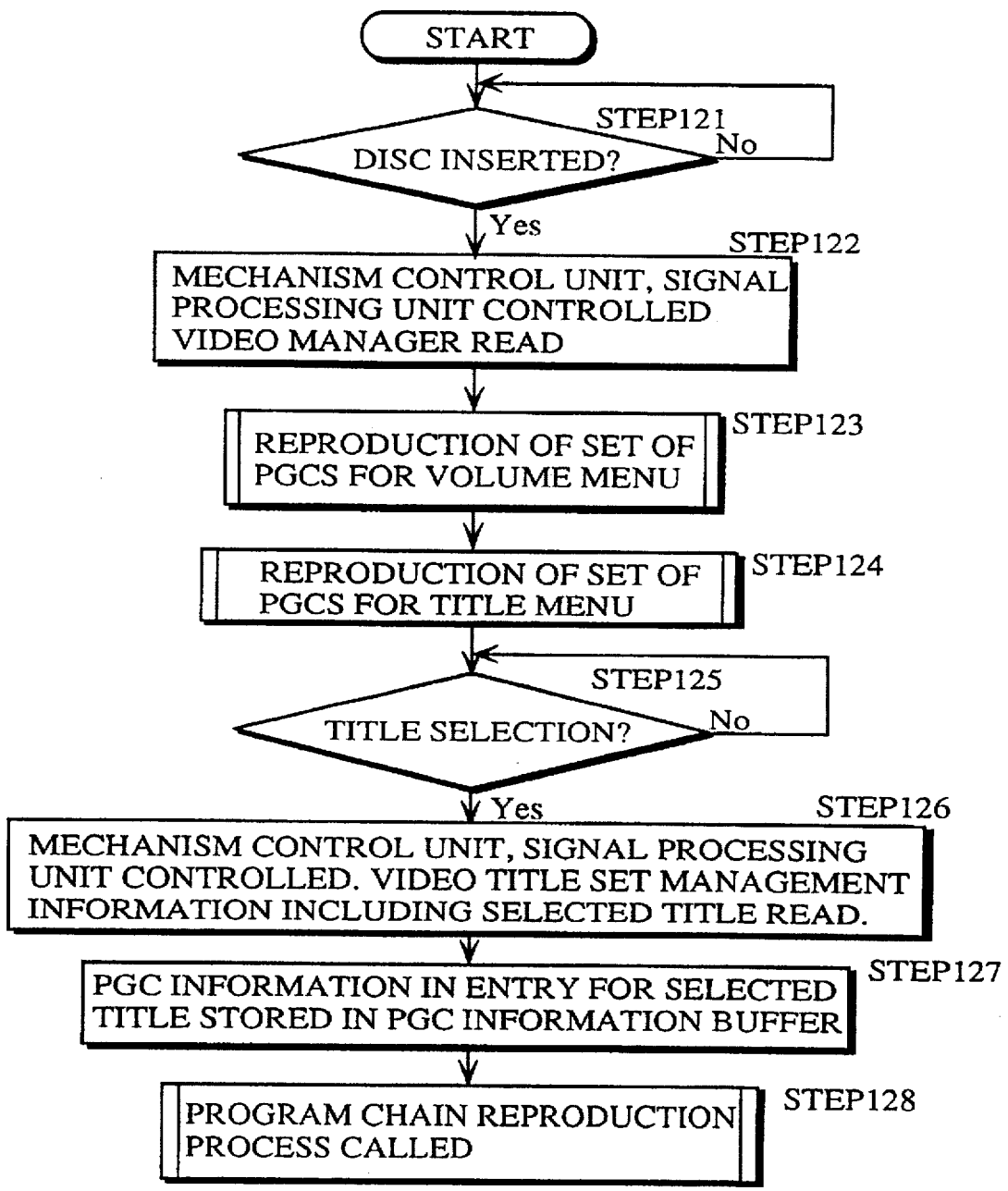
FIG. 13 is a main flowchart showing the process steps of system controlling unit 93.

Now, the operation of DVD player 1 is described with reference to FIG. 13. FIG. 13 is a flowchart showing the process steps of system controlling unit 93.

For inserting an optical disc, the user presses the eject button on the front side of DVD player 1 and places the optical disc on the ejected board. Then, the board, with the optical disc on itself, moves into the DVD player and the optical disc loads in the DVD player.

At step 121, system controlling unit 93 is in a wait state judging whether an optical disc has been inserted. On receiving notification from an optical sensor that an optical disc has been inserted, system controlling unit 93 controls optical disc drive controlling unit 83 and signal processing unit 84 so that the rotation of the disc is controlled while optical pickup is placed in the lead-in area. The disc rotation is stabilized while optical pickup is placed in the lead-in area. After the rotation is stabilized, the optical pickup is moved from the lead-in area toward the circumference and the volume management area is read. Then, according to the information read from the volume management area, a Video Manager is read (step 122).

System controlling unit 93 calculates the address of the program chain of the volume menu by referring to the menu program chain management information in the Video Manager, then reproduces the program chain and stores it in PGC information buffer 31. Then, system controlling unit 93 refers to the PGC information stored in the buffer and recognizes the VOB to be reproduced and calculates its address. System controlling unit 93 outputs control signals to optical disc drive controlling unit 83 and signal processing unit 84. Then the VOB is fetched from the optical disc and reproduced, displaying the volume menu as shown in FIG. 21 on TV monitor 2 (step 123).

It is supposed here that the user selects "make your arms slim" in the menu and performs the determination operation for the item, system controlling unit 93 executes a BRANCH command specifying the title number which is set as a highlight command corresponding to the title (step 125).

By executing the BRANCH command, system controlling unit 93 refers to the title search pointer table of the Video Manager to determine the Video Title Set (VTS) and the VTS title number. Then, system controlling unit 93 outputs control signals to optical disc drive controlling unit 83 and signal processing unit 84, reproduces the Video Title Set management information of the determined video title, and fetches the Video Title Set unit title search pointer table of this information (step 126).

System controlling unit 93 determines the PGC information of the first program chain in the title by referring to the fetched Video Title Set unit title search pointer table. Then, system controlling unit 93 outputs control signals to optical disc drive controlling unit 83 and signal processing unit 84, reproduces the determined PGC information, and stores the information in PGC information buffer 31. The PGC information of the volume menu is overwritten by the PGC information. System controlling unit 93 determines the video object to be reproduced and its address by referring to the stored PGC information, outputs control signals to optical disc drive controlling unit 83 and signal processing unit 84, and reproduces the determined video object.

After this, system controlling unit 93 determines and reproduces video objects in order according to the stored PGC information. System controlling unit 93 determines the next PGC information by referring to the PGC connection information of the current PGC information when it completes reproducing the last video object specified in the current PGC information. Then, system controlling unit 93 discards the current PGC information and stores the next PGC information to continue the reproduction (step 128).

Note that DVD player 1 has a key for selecting an audio channel and a sub-picture channel though the key is not shown in the drawing. The audio channel and the sub-picture channel selected by the user are stored in system registers (not shown in the drawings). When the video object is reproduced, system controlling unit 93 refers to the system registers to determine the effective channels and informs the channels to AV decoding unit 85 by outputting the control signals. As a result, only an effective audio channel and a sub-picture channel provides data to be output together with the moving picture data.

(2.3.1) Operation Example 1 . . . Reproduction Control for Video Title Set V1

Software control of Video Title Set V1 by system controlling unit 93 is described with reference to FIGS. 14 and 15.

It is supposed here that the user selects "make your arms slim." When this happens, PGC information #1 is stored in PGC information buffer 31. At this stage, system controlling unit 93 determines reproduction orders. That is, system controlling unit 93 determines reproduction orders according to "PG reproduction mode" when control branches from a menu to a program chain. This process is achieved by the multiple branch as shown in the flowchart of FIG. 14. At step 140, the PG reproduction mode is read from the PGC information. At step 141, it is judged whether bit pattern of the second field of the read PG reproduction mode is "000 0000." The second field of PGC information #1 stores bit pattern "000 1010,", indicating that the number of reproduction cycles is "10." This allows control to move to step 142.

At step 142, it is judged whether the bit pattern of the first field is "1." Since the first field of PGC information #1 stores bit pattern "1," control moves to step 144.

Now, the operation of system controlling unit 93 is described with reference to FIG. 15. "Random number list" is a one-dimensional array used to store a history of random numbers generated in the shuffle reproduction. "Total number n" is the number of pieces of VOB address information written in the VOB address information table. For PGC information #1, the number is "15." "Specified number k" is a variable representing the number of loops performed in steps 152 through 159.

Figure 14:
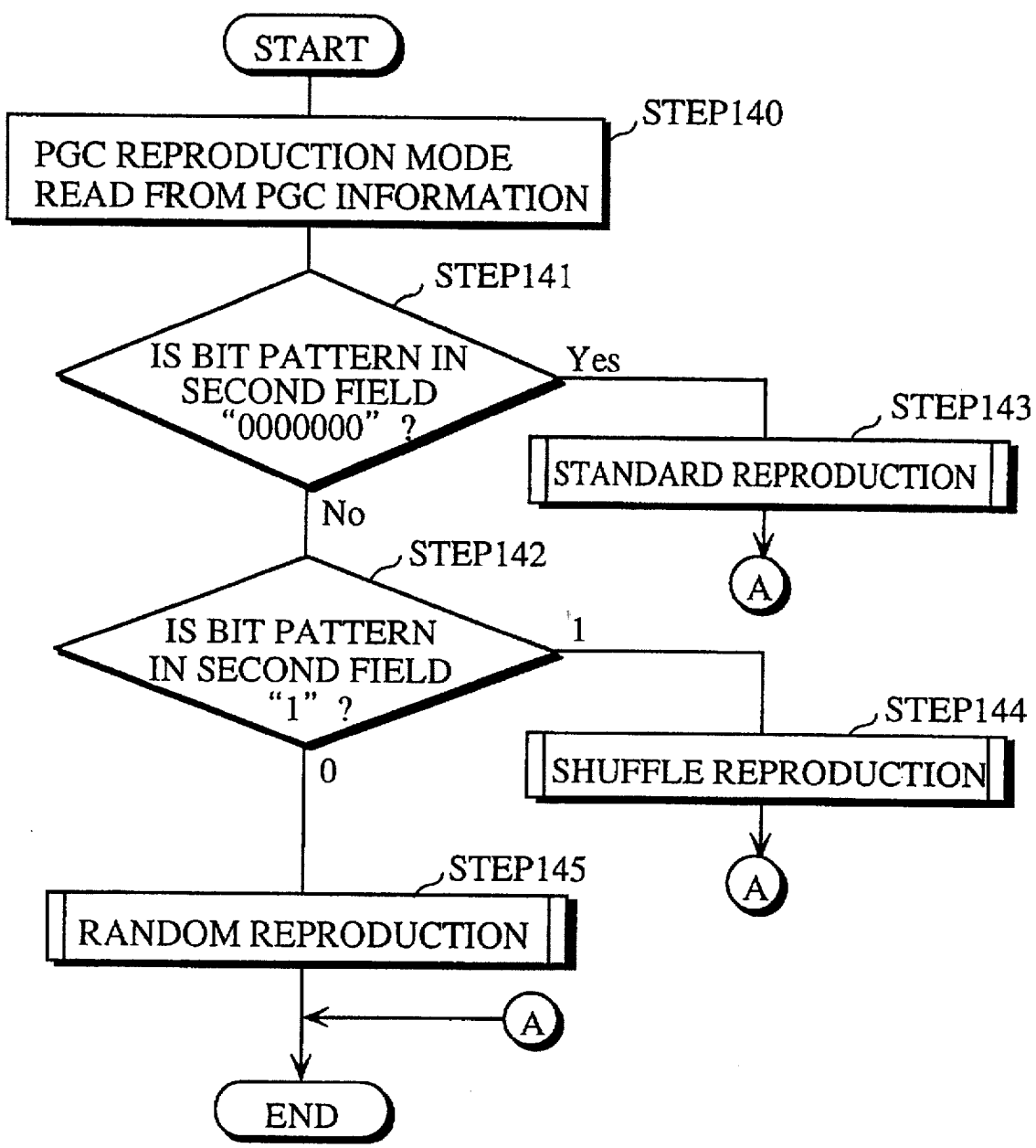
FIG. 14 is a flowchart showing the process steps of system controlling unit 93 at reproduction order determination.
Figure 15:
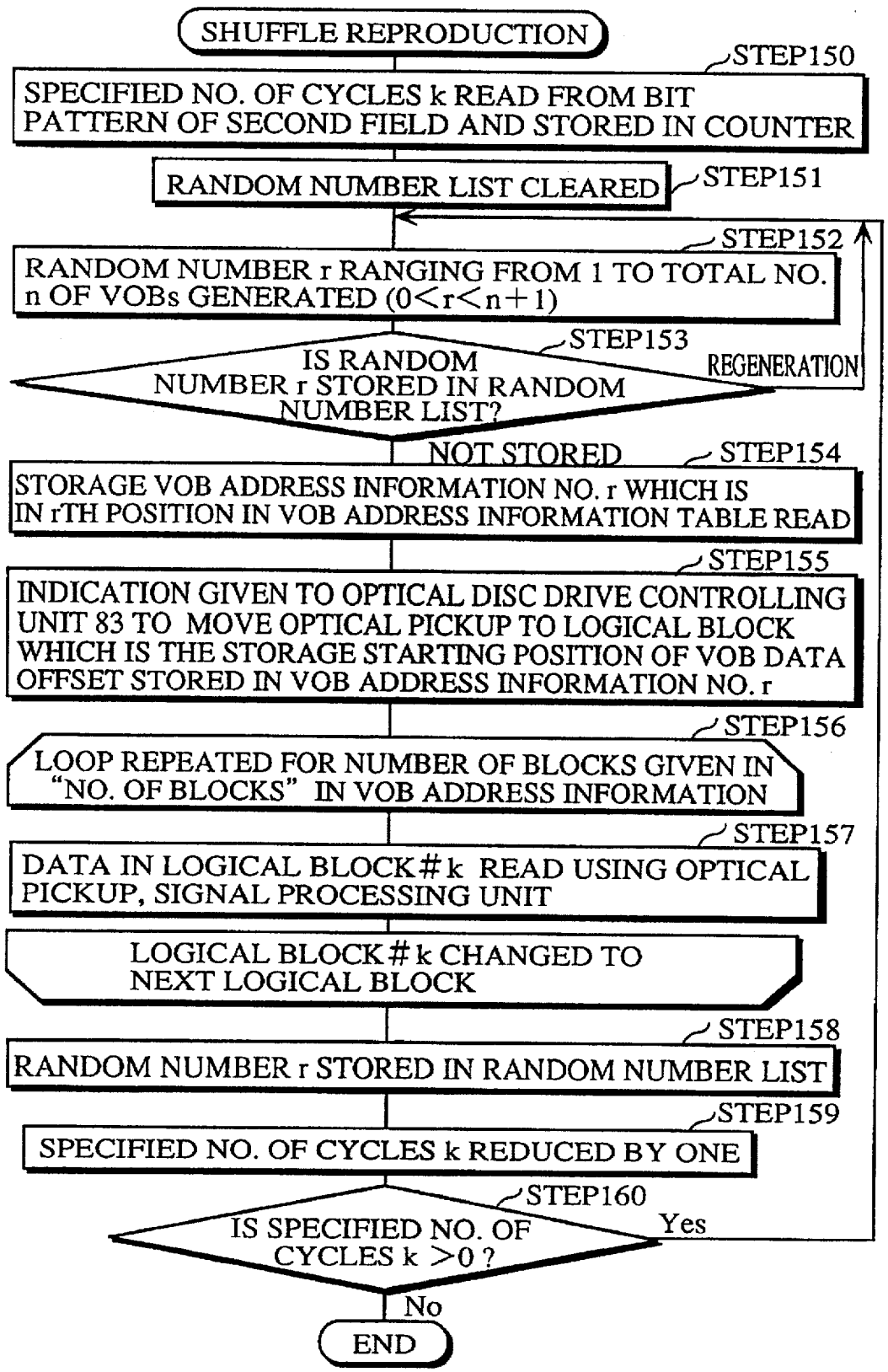
FIG. 15 is a flowchart showing the process steps of system controlling unit 93 at shuffle reproduction.

The flowchart shown in FIG. 15 is the detailed flowchart of step 144 in FIG. 14. At step 150, the bit pattern of the second field representing "specified number" is read from the PGC information. Since the second field has seven bits, the second field can specify the number of cycles ranging from "0" to "127." At step 151, the random number list is cleared to zero. At step 152, random numbers for integers ranging from 1 to 15 (the total number of VOBs) (0<r<n+1) are generated. Here, it is supposed that integer "3" is generated. Note that in the present embodiment, it is supposed that "uniformly random numbers" are generated. For this type of random numbers, the VOBs written in the VOB address information table are uniformly selected. There are other random numbers such as "Gauss random numbers" which include arbitrary distribution. The latter part of this course may be weighted so that exercises in the latter part are selected more frequently.

At step 153, it is judged whether the generated integer "3" is written in the random number list. The integer is not written in the list since PGC information has just been selected. At step 154, the third VOB address information in the VOB address information table is read. At step 155, a position in the spiral track in the optical disc corresponding to the logical block to be read is calculated according to the VOB offset written in the VOB address information. Optical disc drive controlling unit 83 receives the track position and is instructed to move optical pickup to the record start position. Then, optical disc drive controlling unit 83 is instructed to control block reading.

At step 156, the process of step 157 is repeated for each logical block in the VOB. The process of step 157 is to read data recorded at logical block #k through optical pickup and signal processing unit.

Figure 17:
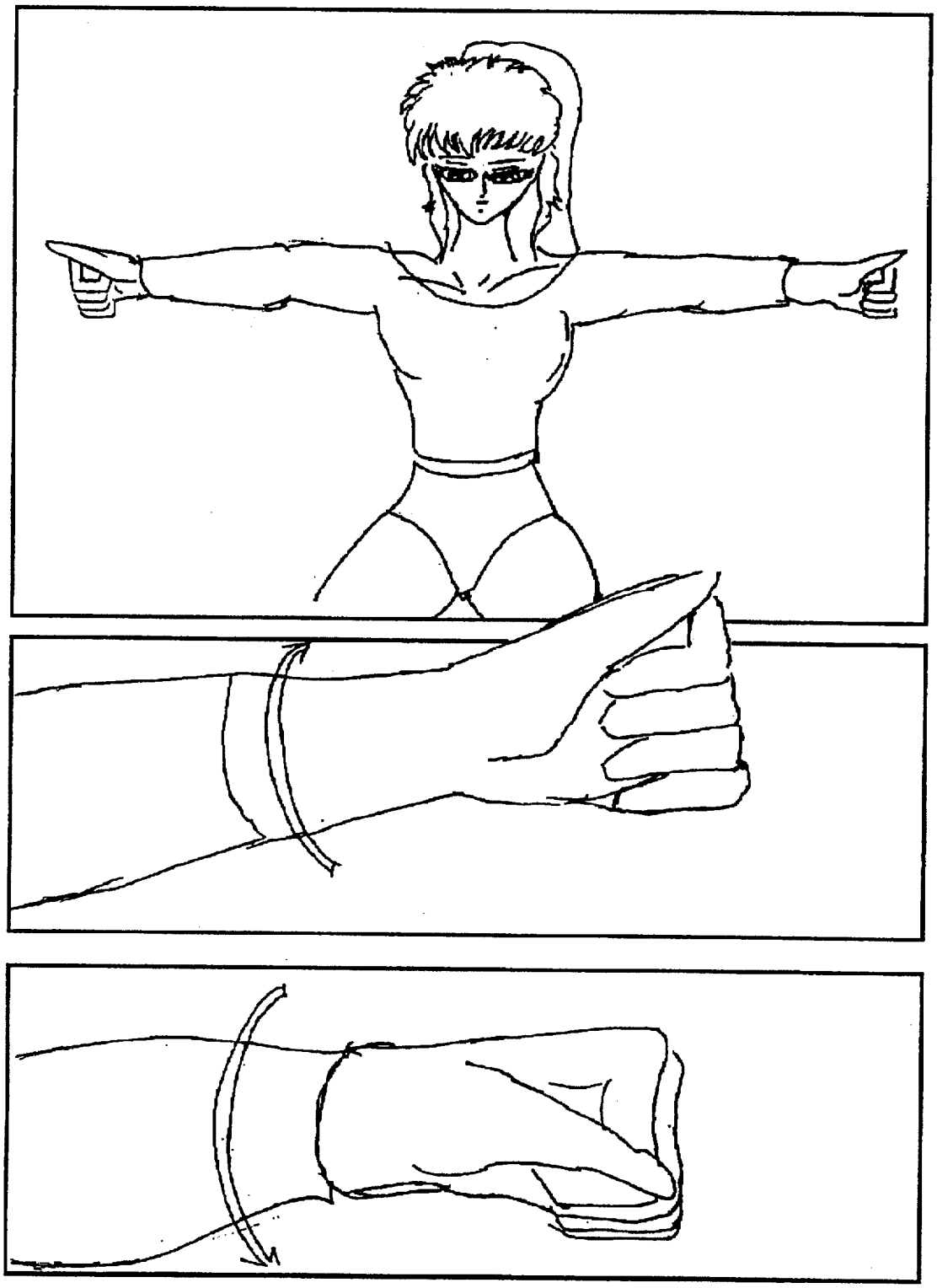
FIG. 17 shows images displayed on the screen when VOB#3 is read.

The data of the logical blocks in the VOB is sequentially read by the control of optical disc drive controlling unit 83 and signal processing unit 84. The read data is separated and reproduced by AV decoding unit 85. The moving picture separated at this stage is displayed on the TV screen and audio data is output as sound. As a result, the screen displays a shot of the instructor stretching her arms horizontally and turning them for several minutes as shown in FIG. 17. At the same time, a back ground music is output from the speakers. The user exercises in the rhythm of the back ground music imitating the motion of the instructor.

After the above process is repeated for each logical block in the VOB address information of VOB#3, control moves to step 158. At step 158, integer 3 is added to the random number list. At step 159, "1" is subtracted from the specified number k stored in the counter. At step 160, it is judged whether the specified number k is more than "0." At the first cycle, control moves to step 152 to generate random numbers.

At step 152, random numbers for integers ranging from 1 to 15 (the total number of VOBs) (0<r<n+1) are generated. Here, it is supposed that integer "3" is generated. At step 153, it is judged whether the generated integer "3" is written in the random number list. Therefore, control moves to step 152 to generate random numbers.

In this way, steps 152 to 153 are repeated while random numbers written in the list are generated. By checking the history written in the random number list, redundant selections of already selected VOBs are avoided.

Suppose integer "5" is generated after a random number are generated twice. Since integer "5" is not written in the random number list, control moves to step 154. The fifth VOB address information in the VOB address information table is read. At step 155, a position in the spiral track in the optical disc corresponding to the logical block to be read is calculated according to the VOB offset written in the fifth VOB address information. Optical disc drive controlling unit 83 receives the track position and is instructed to move optical pickup to the record start position. Then, optical disc drive controlling unit 83 is instructed to control block reading.

At step 156, the process of step 157 is repeated for each logical block in the VOB. The process of step 157 is to read data recorded at logical block #k through optical pickup and signal processing unit.

Figure 18:
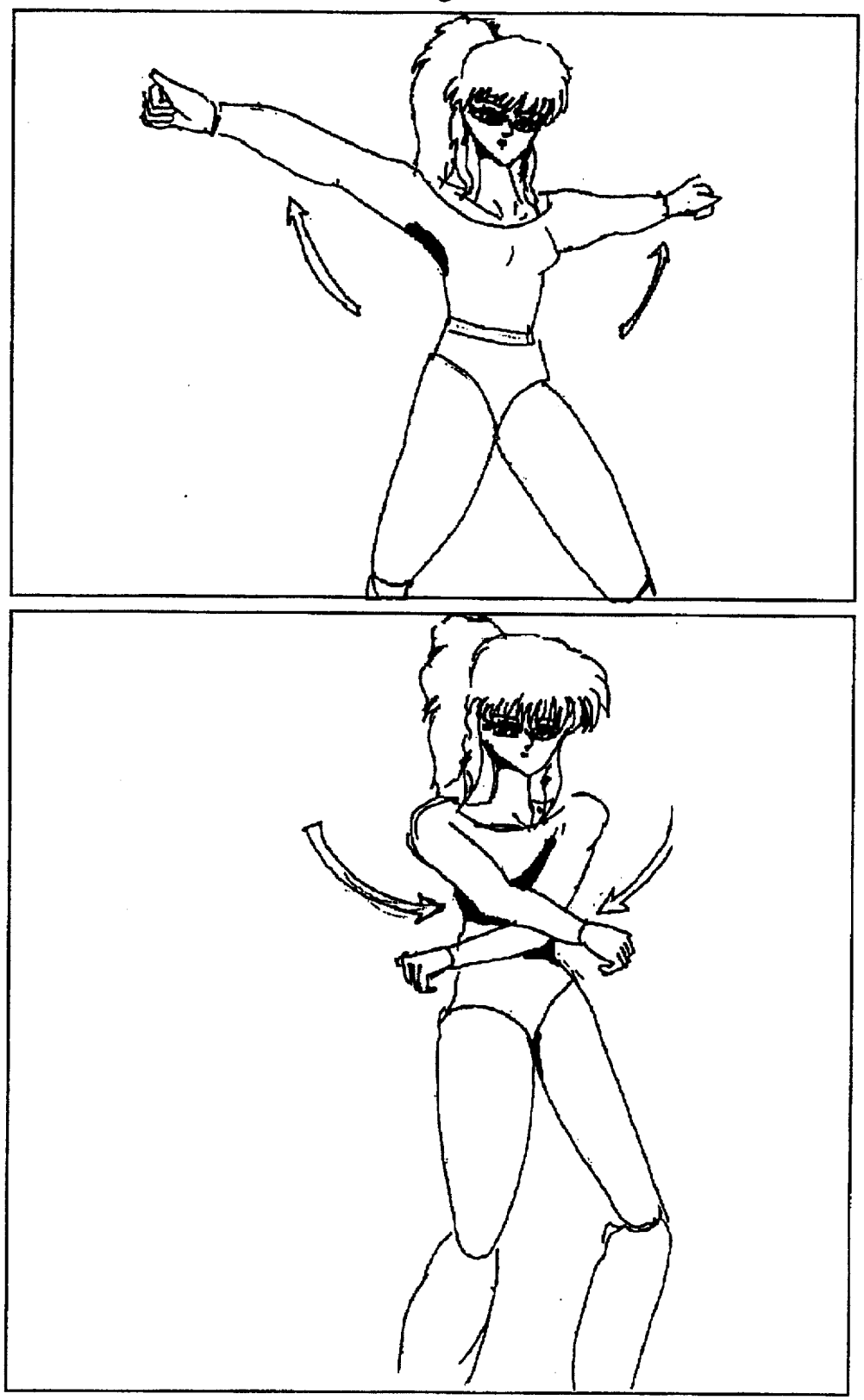
FIG. 18 shows images displayed on the screen when VOB#5 is read.

The data of the logical blocks in the VOB#5 is sequentially read by the control of optical disc drive controlling unit 83 and signal processing unit 84. The read data is separated and reproduced by AV decoding unit 85. The moving picture separated at this stage is displayed on the TV screen and audio data is output as sound. As a result, the screen displays a shot of the instructor stretching her arms horizontally then dropping them and crossing them at her belly for several minutes as shown in FIG. 18. At the same time, another back ground music is output from the speakers. The user exercises in the rhythm of the back ground music imitating the motion of the instructor.

After the above process is repeated for each logical block in the VOB address information of VOB#3, control moves to step 158. At step 158, integer 5 is added to the random number list. After this addition, the random number list has "3" and "5." At step 159, "1" is subtracted from the specified number k stored in the counter. At step 160, it is judged whether the specified number k is more than "0." At the second cycle, control moves to step 152 to generate random numbers.

At step 152, random number for integers ranging from 1 to 15 (the total number of VOBs) (0<r<n+1) are generated. Here, it is supposed that integer "8" is generated. At step 153, it is judged whether the generated integer "8" is written in the random number list. The integer has not been written in the list though "3" and "5" have been. Control moves to step 154. At step 154, the eighth VOB address information in the VOB address information table is read. At step 155, a position in the spiral track in the optical disc corresponding to the logical block to be read is calculated according to the VOB offset written in the VOB address information. Optical disc drive controlling unit 83 receives the track position and is instructed to move optical pickup to the record start position. Then, optical disc drive controlling unit 83 is instructed to control block reading.

At step 156, the process of step 157 is repeated for each logical block in the VOB. The process of step 157 is to read data recorded at logical block #k through optical pickup and signal processing unit.

The data of the logical blocks in the VOB is sequentially read by the control of optical disc drive controlling unit 83 and signal processing unit 84. The read data is separated and reproduced by AV decoding unit 85. The moving picture separated at this stage is displayed on the TV screen and audio data is output as sound. As a result, the screen displays a shot of the instructor stretching her arms and raising them at her back as high as her chest for several minutes as shown in FIG. 19. At the same time, another back ground music is output from the speakers. The user exercises in the rhythm of the back ground music imitating the motion of the instructor.

After the above process is repeated for each logical block in the VOB address information of VOB#3, control moves to step 158. At step 158, integer 8 is added to the random number list. At step 159, "1" is subtracted from the specified number k stored in the counter. At step 160, it is judged whether the specified number k is more than "0." At the third cycle, control moves to step 152 to generate random numbers.

Each time it is judged that a random number has not been written in the random number list at step 153, steps 152 to 159 are repeated. At step 159, the count value is decremented by one at each end of a cycle, and control moves to step 160.

As the count value is decremented by one at step 159, the value reaches the lowest number, "0." When the count value is "0," it is judged as "Yes" at step 160 and the present flowchart ends. Through the above repetitions, the exercise shown by the instructor changes rapidly, and the back ground music also changes. The user has done a good exercise in a short period of time.

Even if the user inserts the same optical disc and selects the same course next day, the different VOBs are reproduced. Since the user enjoys a course every day with rapid changes, the user can see the effect of the exercise appearing in the body from day to day.

<random reproduction>

Figure 16:
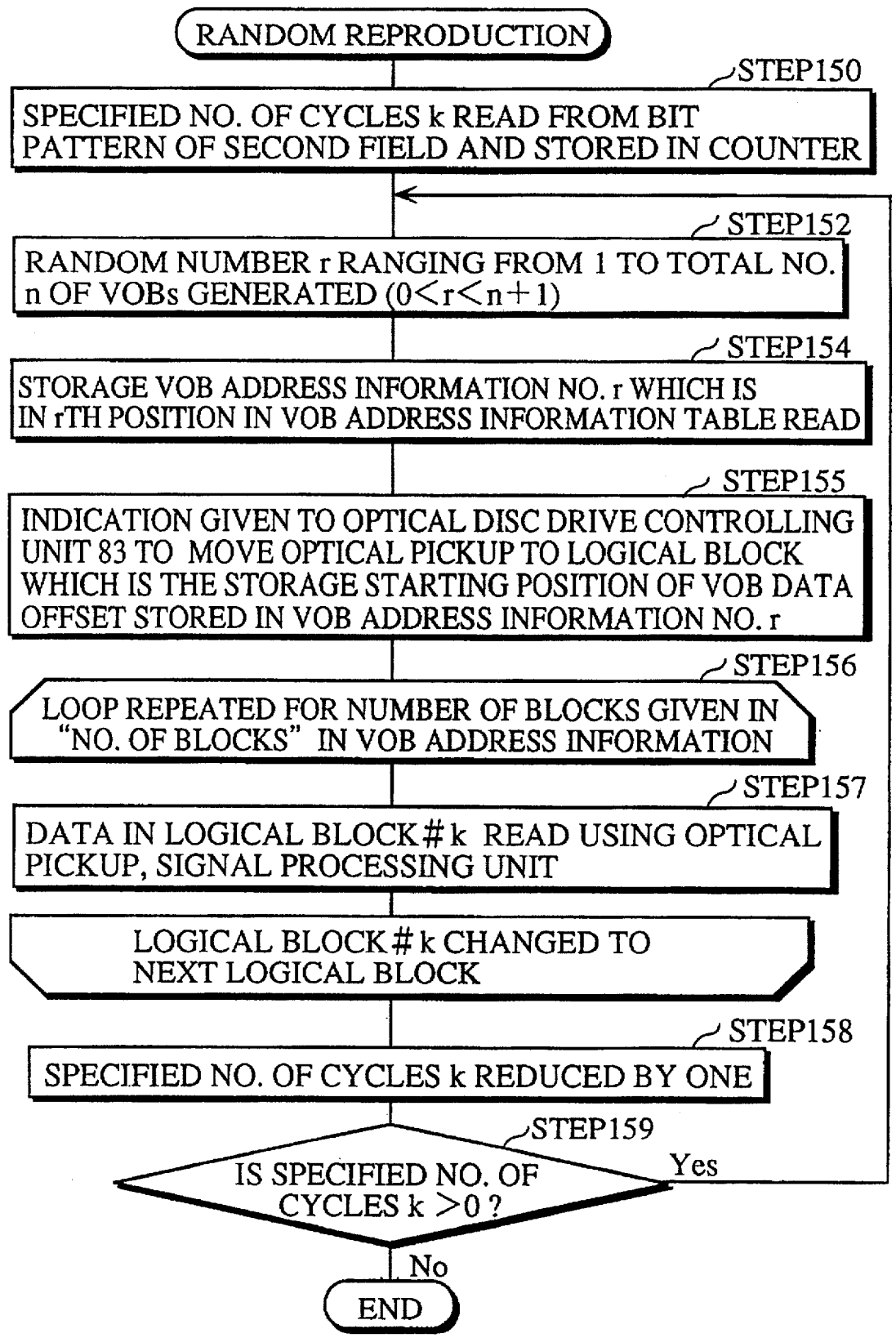
FIG. 16 is a flowchart showing the process steps of system controlling unit 93 at random reproduction.

The random reproduction is achieved by a combination including repetitions. Therefore, the random reproduction is achieved by deleting the check of the random number list from the flowchart of FIG. 15. FIG. 16 shows the flowchart without the check of the random number list.

<Standard reproduction>

For the standard reproduction, the VOBs are reproduced in order as they are written in the VOB address information table. For this purpose, only steps 156 to 157 in the flowchart of FIG. 14 are required.

At this stage, if the user selects "make your waist slim," a series of shots of the instructor moving around with rhythmical steps, raising right leg high, raising left leg high, and jumping are reproduced in succession. That is, if the PGC information corresponding to "make your arms slim" is read by the reproduction apparatus, the exercises of arms are selected at random and displayed on the screen. If the PGC information corresponding to "make your waist slim" is read by the reproduction apparatus, the exercises of waist are selected at random and displayed on the screen.

As apparent from the above description, in the present embodiment, each of the courses such as "make your arms slim" and "make your waist slim" corresponds to a piece of PGC information. A piece of PGC information specifies a reproduction order so that exercises from each course are selected at random and reproduced. Therefore, if the user selects course, concerned exercises are reproduced at random. With this random reproduction, the user can enjoy different orders of exercises every morning. This refreshes the user every morning and makes the user exercise with fresh feeling for the courses.

In the present embodiment, a VOB unit consists of a GOP. It is needless to say that if the stored moving pictures have a reproduction time of about a second, a VOB unit may consist of two or three GOPs with very short reproduction time. In this case, a management information pack is set before such a plurality of consecutive GOPs. The management information pack is effective for the plurality of GOPs.

In the present embodiment, the digital moving picture data under MPEG2 is used for the moving picture data. However, other kinds of moving picture data such as the digital moving picture data under MPEG1 and the digital moving picture data with a conversion algorithm other than DCT (Discrete Cosine Transform) under MPEG may be used as far as the moving picture data can form the multimedia data with the audio data and the sub-picture data.

In the present embodiment, the management information packs are included in VOBUs in units of GOPs, being the units of reproducing moving picture data. However, it is needless to say that if the method for compressing digital moving picture changes, the unit of the management information pack changes according to the compression method.

Now, a method for producing an optical disk used in the present embodiment is described. The editor has to prepare master tapes such as video tapes of various shots filmed with video cameras and music tapes in which songs and sounds are recorded live. The moving pictures and sounds in the tapes are digitized and loaded into a nonlinear editing machine. The editor creates menus and items using application programs such as a graphic editor loaded in the editing machine, reproducing pictures and sounds frame by frame. The editor also creates management information packs having highlight commands by using a GUI generator and the like. Then, the editor encodes the above data under MPEG to create moving picture data, audio data, sub-picture data, and management information pack. Then, the editor creates the VOB unit and VOBs by using the nonlinear editing machine. The editor assigns numbers to the VOBs. Also, the editor creates PGC information #1, #2, #3, . . . , #n, video title set unit title search pointer table, and video title set management information. The editor loads these pieces of data into a memory in a workstation.

The data is converted into logical data sequences so that the data is recorded in the file area. The logical data sequences are recorded into a medium such as the magnetic tape, then converted to physical data sequences. The physical data sequences include volume data with ECC (Error Check Code), E–F conversion, data in the lead-in area and lead-out area. A master optical disk is produced by using the physical data sequences. Then, copies of the master optical disk are manufactured by using a pressing machine.

Conventional CD manufacturing machines may be used for manufacturing the above-constructed optical disk except a part of logical data sequences related to the data construction of the present invention. Concerning this point, please refer to Heitaro Nakajima and Hiroji Ogawa: Compact Disk Dokuhon, Ohmu Ltd. and Applied Physics Society Optics Meeting: Optical Disk System, Asakura Shoten.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A multimedia optical disc comprising a data area and an index area, the data area comprising a plurality of objects each of which includes video data, and the index area comprising a plurality of sub-areas each of which includes addresses of objects selected from the plurality of objects stored in the data area, a flag indicating a random reproduction of the objects selected, and a number of repeats of the random reproduction.

2. The multimedia optical disc of claim 1, wherein each of the plurality of sub-areas further includes a flag indicating whether to prohibit a redundant use of objects at the random reproduction.

3. The multimedia optical disc of claim 2, further comprising a reproduction area for storing data for reproducing a menu which is to be displayed first on a display of a reproduction apparatus, wherein the data for reproducing a menu includes a plurality of menu items which respectively correspond to the plurality of sub-areas.

4. The multimedia optical disc of claim 3, wherein the reproduction area further comprises management information, wherein the management information includes a plurality of identifiers of the plurality of menu items and a plurality of addresses of the plurality of sub-areas.

5. The multimedia optical disc of claim 4, comprising a first transparent substrate and a second transparent substrate which are bonded with an information layer in between, each of the first transparent substrate and the second transparent substrate having a thickness range of 0.5 mm to 0.7 mm, and the information layer including the index area and the data area.

6. The multimedia optical disc of claim 1, wherein the index area further comprises a certain sub-area which includes certain addresses of certain objects selected from the plurality of objects stored in the data area, wherein the certain addresses are aligned in order of reproduction.

7. The multimedia optical disc of claim 6, further comprising a reproduction area for storing data for reproducing an initial menu which is to be displayed first on a display of a reproduction apparatus, wherein the data for reproducing a menu includes a plurality of menu items which respectively correspond to the plurality of sub-areas.

8. The multimedia optical disc of claim 7, comprising a first transparent substrate and a second transparent substrate which are bonded with an information layer in between, each of the first transparent substrate and the second transparent substrate having a thickness range of 0.5 mm to 0.7 mm, and the information layer including the index area and the data area.

9. A multimedia optical disc comprising a data area and an index area, the data area comprising a plurality of objects each of which includes at least video data, and the index area comprising:

a plurality of first sub-areas each of which includes addresses of objects selected from the plurality of objects according to a first standard, a flag indicating a random reproduction of the objects selected, and a number of repeats of the random reproduction; and a plurality of second sub-areas each of which includes addresses of objects selected from the plurality of objects according to a second standard, a flag indicating a random reproduction of the objects selected, and a number of repeats of the random reproduction.

10. The multimedia optical disc of claim 9, wherein each of the plurality of first sub-areas and the plurality of second sub-areas further includes a flag indicating whether to prohibit a redundant use of objects at the random reproduction.

11. The multimedia optical disc of claim 10, further comprising a reproduction area for storing data for reproducing a menu which is to be displayed first on a display of a reproduction apparatus, wherein the data for reproducing a menu includes a plurality of menu items which respectively correspond to the plurality of sub-areas.

12. The multimedia optical disc of claim 11, wherein the reproduction area further comprises management information, wherein the management information includes a plurality of identifiers of the plurality of menu items and a plurality of addresses of the plurality of sub-areas.

13. The multimedia optical disc of claim 12, comprising a first transparent substrate and a second transparent substrate which are bonded with an information layer in between, each of the first transparent substrate and the second transparent substrate having a thickness range of 0.5 mm to 0.7 mm, and the information layer including the index area and the data area.

14. A reproduction apparatus for reproducing a multimedia optical disc, the multimedia optical disc comprising a data area and an index area, the data area comprising a plurality of objects each of which includes video data, and the index area comprising a plurality of sub-areas each of which includes addresses of objects selected from the plurality of objects stored in the data area, a flag indicating a random reproduction of the objects selected, and a number of repeats of the random reproduction, wherein the reproduction apparatus comprises:

an optical pickup for optically reading the plurality of objects from the multimedia optical data;

an optical disc driving mechanism for driving the multimedia optical disc so that the optical pickup moves to a desired area on the multimedia optical disc;

an AV decoder for decoding the video data in the read objects;

first controlling means for controlling the optical disc driving mechanism so that contents of a desired sub-area are read;

random number generating means for generating random numbers, wherein the random number generating means is activated according to the flag indicating a random reproduction included in the read contents of the desired sub-area;

first address reading means for reading at least one address from the addresses included in the desired sub-area by using the generated random numbers; and a second controlling means for controlling the optical disc driving mechanism and the video decoder so that objects corresponding to the read address are reproduced.

15. The reproduction apparatus of claim 14, further comprising:

a counter for counting generations of random numbers by setting the number of repeats of the random reproduction described in the desired sub-area as an upper limit value for counting; and count value judging means for judging whether a count value of the counter exceeds the upper limit value each time a random number is generated, wherein the random number generating means is activated repeatedly unless the count value exceeds the upper limit value.

16. The reproduction apparatus of claim 15, further comprising:

flag judging means for judging whether the flag indicating a random reproduction is included in the read contents of the desired sub-area;

second address reading means for reading the addresses from the desired sub-area if the flag is not included in the read contents;

managing means for activating the random number generating means if the flag is included in the read contents and activating the second address reading means if the flag is not included in the read contents, wherein the second controlling means controls the optical disc driving mechanism and the video decoder so that at least one address is received from both of the first address reading means and the second address reading means and the received address is reproduced.

17. The reproduction apparatus of claim 16, wherein the multimedia optical disc further comprises a reproduction area for storing data for reproducing a menu which is to be displayed first on a display of a reproduction apparatus, wherein the data for reproducing a menu includes a plurality of menu items which respectively correspond to the plurality of sub-areas, wherein the reproduction area further comprises management information, wherein the management information includes a plurality of identifiers of the plurality of menu items and a plurality of addresses of the plurality of sub-areas, wherein the reproduction apparatus further comprises:

menu item receiving means for receiving a desired menu item selected from the menu; and third address reading means for referring to the management information and reading a address corresponding to the desired menu item, wherein the first controlling means controls the optical disc driving mechanism and the video decoder so that at least one object is reproduced based on the read address.

18. A reproduction method for reproducing a plurality of objects based on a plurality pieces of reproduction control information, wherein each of the plurality of objects includes video data, wherein each of the plurality pieces of reproduction control information includes a set of identifiers each of which corresponding to an object, a flag, and a number of reproduction repeats, wherein the reproduction method comprising:

a first reading step for reading a piece of the plurality pieces of reproduction control information;

a random number generating step for generating a random number according to "on" and "off" of the flag included in the piece of reproduction control information read in the first reading step;

a determining step for determining an identifier among the set of identifiers by using the random number generated in the random number generating step;

a second reading step for reading an object specified by the identifier determined in the determining step;

a decoding step for decoding the video data included in the read object; and a repeating step for activating the random number generating step repeatedly based on the number of reproduction repeats included in the piece of reproduction control information read in the first reading step.

* * * * *